(12) United States Patent
Takegami et al.

(10) Patent No.: US 11,796,238 B2
(45) Date of Patent: Oct. 24, 2023

(54) HEAT SOURCE UNIT AND REFRIGERATION APPARATUS

(71) Applicant: DAIKIN INDUSTRIES, LTD., Osaka (JP)

(72) Inventors: Masaaki Takegami, Osaka (JP); Yoshikazu Uehara, Osaka (JP); Akitoshi Ueno, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/093,657

(22) Filed: Jan. 5, 2023

(65) Prior Publication Data
US 2023/0152019 A1 May 18, 2023

Related U.S. Application Data

(63) Continuation of application No. PCT/JP2021/023189, filed on Jun. 18, 2021.

(30) Foreign Application Priority Data

Aug. 28, 2020 (JP) .................................. 2020-144348

(51) Int. Cl.
*F25B 1/10* (2006.01)
*F25B 49/02* (2006.01)
(Continued)

(52) U.S. Cl.
CPC .............. *F25B 49/022* (2013.01); *F25B 1/10* (2013.01); *F25B 41/22* (2021.01); *F25B 41/31* (2021.01);
(Continued)

(58) Field of Classification Search
CPC ........ F25B 49/022; F25B 41/31; F25B 41/22; F25B 1/10; F25B 43/006; F25B 2600/0253; F25B 2700/193
See application file for complete search history.

(56) References Cited

U.S. PATENT DOCUMENTS 4,947,655 A * 8/1990 Shaw ........................ F25B 5/02
 62/505
6,938,430 B2 * 9/2005 Tanimoto ................ F25B 13/00
 62/196.2
(Continued)

FOREIGN PATENT DOCUMENTS

CN 110513926 A * 11/2019
EP 3370016 A1 * 9/2018 ................ F25B 1/10
(Continued)

OTHER PUBLICATIONS

International Search Report for PCT/JP2021/023189 (PCT/ISA/210) dated Sep. 7, 2021.
(Continued)

*Primary Examiner* — Miguel A Diaz
(74) *Attorney, Agent, or Firm* — Birch, Stewart, Kolasch & Birch, LLP

(57) ABSTRACT

If a first condition that an intermediate pressure corresponding to a pressure of an intermediate flow path is greater than a predetermined value is satisfied in an operation in which first, second, and third compressors are operated, the control unit executes a first action of increasing the number of revolutions of the third compressor.

17 Claims, 13 Drawing Sheets

(51) Int. Cl.
  *F25B 41/31* (2021.01)
  *F25B 41/22* (2021.01)
  *F25B 43/00* (2006.01)

(52) U.S. Cl.
  CPC .... *F25B 43/006* (2013.01); *F25B 2600/0253* (2013.01); *F25B 2700/193* (2013.01)

(56) References Cited

U.S. PATENT DOCUMENTS

| | | | | |
|---|---|---|---|---|
| 7,155,928 | B2* | 1/2007 | Takegami | F25B 13/00 62/510 |
| 9,625,183 | B2* | 4/2017 | Wallace | F25B 9/008 |
| 9,709,302 | B2* | 7/2017 | Martin | F25B 15/06 |
| 9,726,411 | B2* | 8/2017 | Zimmermann | F25B 1/10 |
| 10,801,757 | B2* | 10/2020 | Hellmann | F25B 41/20 |
| 11,353,245 | B2* | 6/2022 | Cole | F25B 5/02 |
| 2009/0077985 | A1* | 3/2009 | Takegami | F25B 13/00 62/175 |
| 2010/0199694 | A1* | 8/2010 | Taras | F25B 1/10 62/513 |
| 2014/0208785 | A1* | 7/2014 | Wallace | F25B 49/02 62/190 |
| 2015/0345835 | A1* | 12/2015 | Martin | F25B 15/06 62/238.3 |
| 2016/0258662 | A1* | 9/2016 | Zimmermann | F25B 9/008 |
| 2021/0207851 | A1* | 7/2021 | Cole | F25B 41/20 |
| 2022/0113064 | A1 | 4/2022 | Takegami et al. | |
| 2022/0120480 | A1* | 4/2022 | Takegami | F25B 41/31 |

FOREIGN PATENT DOCUMENTS

| | | | | |
|---|---|---|---|---|
| EP | 3693685 | A1 * | 8/2020 | F25B 1/10 |
| EP | 3845828 | A1 * | 7/2021 | F25B 1/10 |
| JP | 2009097847 | A * | 5/2009 | |
| JP | 2019-66158 | A | 4/2019 | |
| JP | 2019-203536 | A | 11/2019 | |
| JP | 2021-9014 | A | 1/2021 | |
| WO | WO-2009082405 | A1 * | 7/2009 | F25B 1/10 |
| WO | WO-2009147852 | A1 * | 12/2009 | F25B 1/10 |
| WO | WO-2020230376 | A1 * | 11/2020 | F25B 13/00 |
| WO | WO-2020262624 | A1 * | 12/2020 | B25D 9/20 |
| WO | WO-2021065113 | A1 * | 4/2021 | F25B 13/00 |

OTHER PUBLICATIONS

International Preliminary Report on Patentability and the Written Opinion of the International Searching Authority for International Application No. PCT/JP2021/023189, dated Mar. 9, 2023.

* cited by examiner

US 11,796,238 B2

HEAT SOURCE UNIT AND REFRIGERATION APPARATUS

CROSS REFERENCE TO RELATED APPLICATIONS

This application is a Continuation of PCT International Application No. PCT/JP2021/023189, filed on Jun. 18, 2021, which claims priority under 35 U.S.C. 119(a) to Patent Application No. 2020-144348, filed in Japan on Aug. 28, 2020, all of which are hereby expressly incorporated by reference into the present application.

TECHNICAL FIELD

The present disclosure relates to a heat source unit and a refrigeration apparatus.

BACKGROUND ART

A refrigeration apparatus that performs a refrigeration cycle has been known in the art. In the refrigeration apparatus of Patent Document 1, an air-conditioning unit and a refrigeration-facility unit are connected to a heat source circuit to constitute a refrigerant circuit. The air-conditioning unit conditions air in a room. The refrigeration-facility unit cools air in a show case for refrigeration/freezing or any other refrigeration facility.

The refrigeration apparatus performs a cooling and refrigeration-facility operation. The refrigerant circuit performs a refrigeration cycle in which the high pressure is equal to or greater than a critical pressure. In the refrigeration cycle, a heat source heat exchanger of the heat source circuit functions as a radiator, and a utilization heat exchanger of the air-conditioning unit and a utilization heat exchanger of the refrigeration-facility unit function as evaporators. The evaporation temperature of a refrigerant in the air-conditioning unit is higher than that of the refrigerant in the refrigeration-facility unit. In the cooling and refrigeration-facility operation, air-conditioning of an indoor space and cooling of air in a refrigeration facility are performed in parallel.

CITATION LIST

Patent Document

Patent Document 1: Japanese Unexamined Patent Publication No. 2019-66158

SUMMARY

A first aspect is directed to a heat source unit including: a heat source circuit (11) connected to an air-conditioning unit (60) and a refrigeration-facility unit (70) to constitute a refrigerant circuit (6) for performing a refrigeration cycle in which a high pressure is equal to or greater than a critical pressure; and a control unit (101).

DESCRIPTION OF EMBODIMENTS

Hereinafter, embodiments will be described with reference to the drawings. The following embodiments are merely exemplary ones in nature, and are not intended to limit the scope, application, or uses of the invention.

EMBODIMENT

<General Configuration>

A refrigeration apparatus (1) according to an embodiment performs cooling of an object to be cooled and air-conditioning of an indoor space in parallel. The object to be cooled herein includes air in facilities such as a refrigerator, a freezer, and a show case. Hereinafter, such facilities are each referred to as a refrigeration facility.

Figure 1:
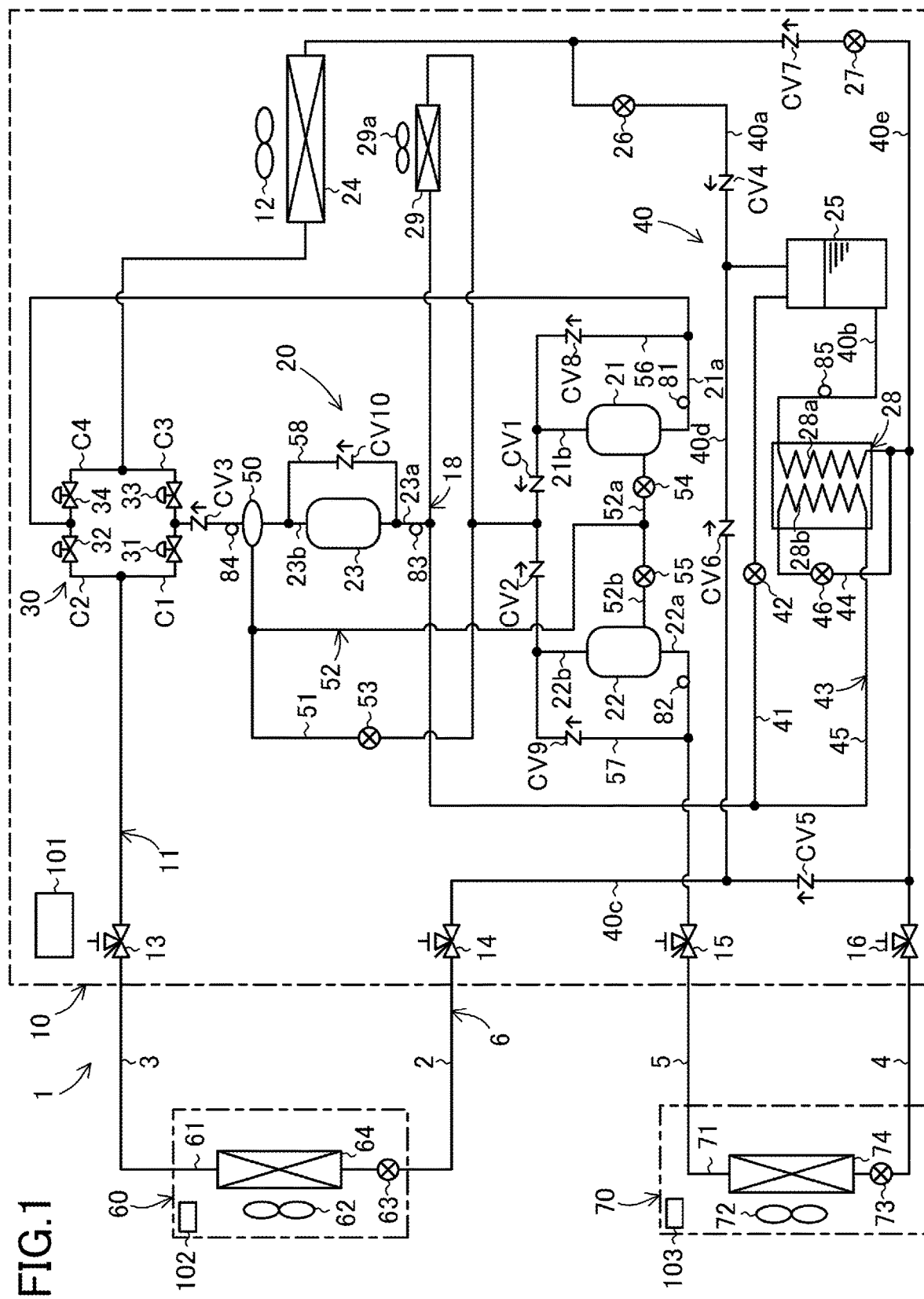
FIG. 1 is a piping system diagram of a refrigeration apparatus according to an embodiment.
Figure 2:
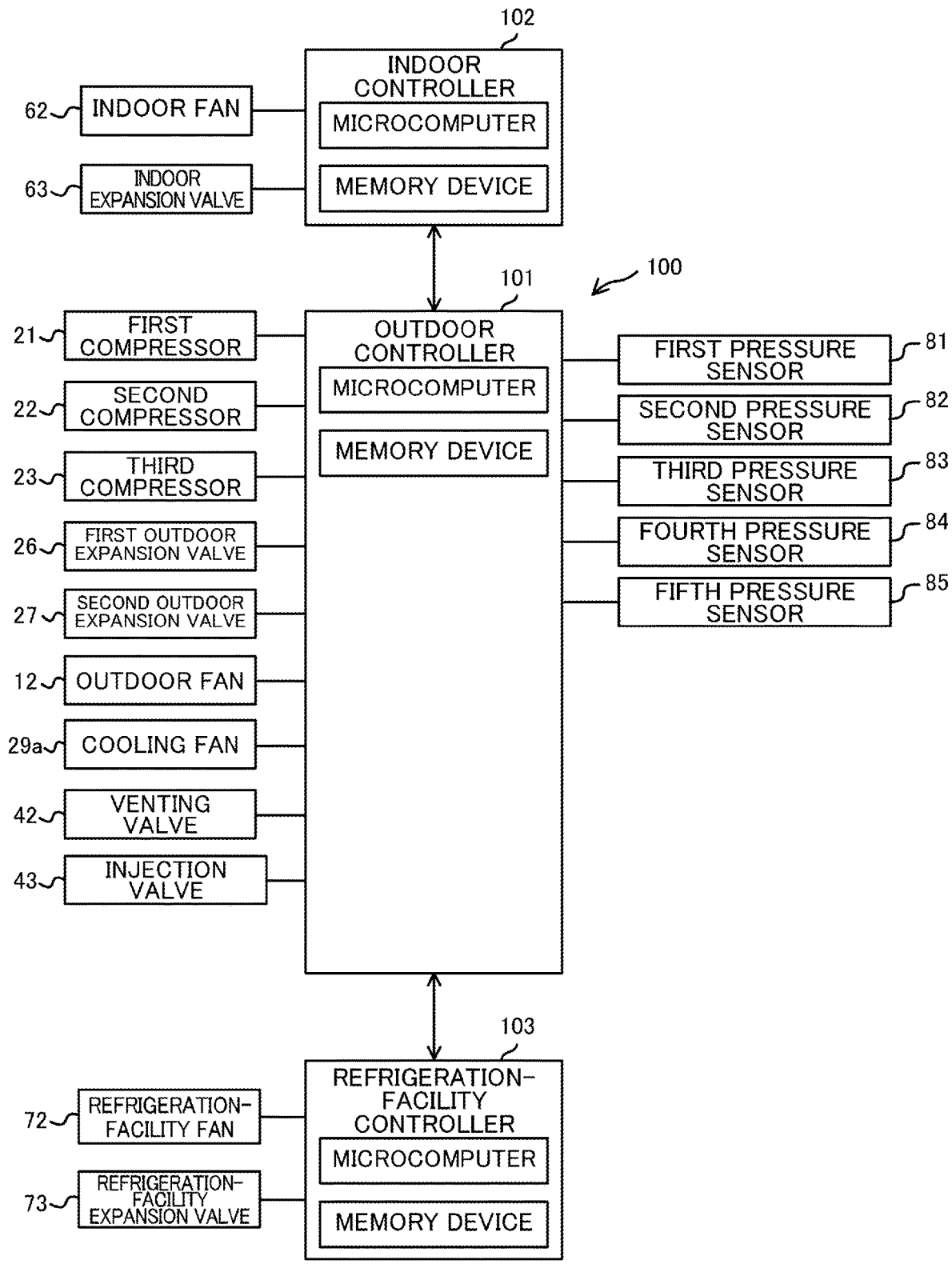
FIG. 2 is a block diagram illustrating a relationship among controllers, various sensors, and various components.

As illustrated in FIG. 1, the refrigeration apparatus (1) includes a heat source unit (10) placed outside, an air-conditioning unit (60) configured to perform air-conditioning of an indoor space, and a refrigeration-facility unit (70) configured to cool inside air. As illustrated in FIG. 2, the refrigeration apparatus (1) includes a controller (100) configured to control a refrigerant circuit (6). FIG. 1 shows a single air-conditioning unit (60). The refrigeration apparatus (1) may include two or more air-conditioning units (60) connected to each other in parallel. FIG. 1 shows a single refrigeration-facility unit (70). The refrigeration apparatus (1) may include two or more refrigeration-facility units (70) connected to each other in parallel. These units (10, 60, 70) are connected to each other via four connection pipes (2, 3, 4, 5) to constitute a refrigerant circuit (6).

The four connection pipes (2, 3, 4, 5) consist of a first liquid connection pipe (2), a first gas connection pipe (3), a second liquid connection pipe (4), and a second gas connection pipe (5). The first liquid connection pipe (2) and the first gas connection pipe (3) are associated with the air-conditioning unit (60). The second liquid connection pipe (4) and the second gas connection pipe (5) are associated with the refrigeration-facility unit (70).

The refrigerant circuit (6) is filled with a refrigerant. The refrigerant circuit (6) circulates the refrigerant to perform a refrigeration cycle. The refrigerant of this embodiment is carbon dioxide. The refrigerant circuit (6) performs the refrigeration cycle so that the refrigerant has a pressure equal to or greater than a critical pressure. The refrigerant may be a natural refrigerant other than carbon dioxide.

<Outline of Heat Source Unit>

The heat source unit (10) includes a heat source circuit (11) and an outdoor fan (12). The heat source circuit (11) includes a compression element (20), an outdoor heat exchanger (24), and a gas-liquid separator (25). The heat source circuit (11) includes a first outdoor expansion valve (26) and a second outdoor expansion valve (27). The heat source circuit (11) further includes a cooling heat exchanger (28) and an intercooler (29).

The heat source circuit (11) includes four shut-off valves (13, 14, 15, 16). The four shut-off valves consist of a first gas shut-off valve (13), a first liquid shut-off valve (14), a second gas shut-off valve (15), and a second liquid shut-off valve (16).

The first gas connection pipe (3) is connected to the first gas shut-off valve (13). The first liquid connection pipe (2) is connected to the first liquid shut-off valve (14). The second gas connection pipe (5) is connected to the second gas shut-off valve (15). The second liquid connection pipe (4) is connected to the second liquid shut-off valve (16).

<Compression Element>

The compression element (20) compresses the refrigerant. The compression element (20) includes a first compressor (21), a second compressor (22), and a third compressor (23). The compression element (20) performs an operation in which the refrigerant is compressed in a single stage and an operation in which the refrigerant is compressed in two stages.

The first compressor (21) is an air-conditioning compressor associated with the air-conditioning unit (60). The second compressor (22) is a refrigeration-facility compressor associated with the refrigeration-facility unit (70). The first and second compressors (21) and (22) are low-stage compressors. The first and second compressors (21) and (22) are connected in parallel.

The third compressor (23) is a high-stage compressor. The third compressor (23) is connected in series to the first compressor (21). The third compressor (23) is connected in series to the second compressor (22).

The first, second, and third compressors (21), (22), and (23) are each a rotary compressor in which a motor drives a compression mechanism. The first, second, and third compressors (21), (22), and (23) are each a variable displacement compressor. The number of revolutions of each of the first, second, and third compressors (21), (22), and (23) is adjusted by an inverter device.

A first suction pipe (21a) and a first discharge pipe (21b) are connected to the first compressor (21). A second suction pipe (22a) and a second discharge pipe (22b) are connected to the second compressor (22). A third suction pipe (23a) and a third discharge pipe (23b) are connected to the third compressor (23).

<Intermediate Flow Path>

The heat source circuit (11) includes an intermediate flow path (18). The intermediate flow path (18) connects discharging portions of the first and second compressors (21) and (22) and a suction portion of the third compressor (23) together. The intermediate flow path (18) includes the first discharge pipe (21b), the second discharge pipe (22b), and the third suction pipe (23a).

<Flow Path Switching Mechanism>

The flow path switching mechanism (30) switches the flow path for the refrigerant. The flow path switching mechanism (30) includes a first flow path (C1), a second flow path (C2), a third flow path (C3), and a fourth flow path (C4). The first, second, third, and fourth flow paths (C1), (C2), (C3), and (C4) are connected in a bridge configuration.

One end of the first flow path (C1) and one end of the third flow path (C3) are connected to a discharging portion of the third compressor (23) via the third discharge pipe (23b). One end of the second flow path (C2) and one end of the fourth flow path (C4) are connected to a suction portion of the first compressor (21) via the first suction pipe (21a). The other end of the first flow path (C1) and the other end of the second flow path (C2) are connected to the air-conditioning unit (60) via the first gas connection pipe (3). The other end of the third flow path (C3) and the other end of the fourth flow path (C4) are connected to a gas end of the outdoor heat exchanger (24).

The flow path switching mechanism (30) includes a first on-off valve (31), a second on-off valve (32), a third on-off valve (33), and a fourth on-off valve (34). The first on-off valve (31) opens and closes the first flow path (C1). The second on-off valve (32) opens and closes the second flow path (C2). The third on-off valve (33) opens and closes the third flow path (C3). The fourth on-off valve (34) opens and closes the fourth flow path (C4). Each of the on-off valves (31, 32, 33, 34) is configured as an electromagnetic on-off valve. Each of the on-off valves (31, 32, 33, 34) may be an electronic expansion valve having a variable opening degree.

<Outdoor Heat Exchanger and Outdoor Fan>

The outdoor heat exchanger (24) corresponds to a heat source heat exchanger of the present disclosure. The outdoor heat exchanger (24) is a fin-and-tube air heat exchanger. The outdoor fan (12) is arranged near the outdoor heat exchanger (24). The outdoor fan (12) transfers outdoor air. The outdoor heat exchanger (24) exchanges heat between a refrigerant flowing therethrough and outdoor air transferred from the outdoor fan (12).

<Liquid Side Flow Path>

The heat source circuit (11) includes a liquid side flow path (40). The liquid side flow path (40) is provided between a liquid end of the outdoor heat exchanger (24) and a pair of the two liquid shut-off valves (14, 16). The liquid side flow path (40) includes first to fifth pipes (40a, 40b, 40c, 40d, 40e).

One end of the first pipe (40a) is connected to the liquid end of the outdoor heat exchanger (24). The other end of the first pipe (40a) is connected to the top of the gas-liquid separator (25). One end of the second pipe (40b) is connected to the bottom of the gas-liquid separator (25). The other end of the second pipe (40b) is connected to the second liquid shut-off valve (16). One end of the third pipe (40c) is connected to an intermediate portion of the second pipe (40b). The other end of the third pipe (40c) is connected to the first liquid shut-off valve (14). One end of the fourth pipe (40d) is connected to the first pipe (40a) between the first outdoor expansion valve (26) and the gas-liquid separator (25). The other end of the fourth pipe (40d) is connected to an intermediate portion of the third pipe (40c). One end of the fifth pipe (40e) is connected to the first pipe (40a) between the outdoor heat exchanger (24) and the first outdoor expansion valve (26). The other end of the fifth pipe (40e) is connected to the second pipe (40b) between the gas-liquid separator (25) and the junction between the second pipe (40b) and the third pipe (40c).

<Outdoor Expansion Valve>

The first outdoor expansion valve (26) is provided in the first pipe (40a). The first outdoor expansion valve (26) is provided in the first pipe (40a) between the liquid end of the outdoor heat exchanger (24) and the junction between the first pipe (40a) and the fourth pipe (40d). The second outdoor expansion valve (27) is provided in the fifth pipe (40e). The first and second outdoor expansion valves (26) and (27) are each an expansion valve having a variable opening degree. The first and second outdoor expansion valves (26) and (27) are each an electronic expansion valve that has its opening degree adjusted based on a pulse signal.

<Gas-Liquid Separator>

The gas-liquid separator (25) is a closed container that stores the refrigerant. The gas-liquid separator (25) separates the refrigerant into a gas refrigerant and a liquid refrigerant. A gas layer and a liquid layer are formed inside the gas-liquid separator (25). The gas layer is formed near the top of the gas-liquid separator (25). The liquid layer is formed near the bottom of the gas-liquid separator (25).

<Venting Pipe>

The heat source circuit (11) has a venting pipe (41). One end of the venting pipe (41) is connected to the top of the gas-liquid separator (25). The other end of the venting pipe (41) is connected to the intermediate flow path (18). The venting pipe (41) sends the gas refrigerant in the gas-liquid separator (25) to the intermediate flow path (18).

The venting pipe (41) is provided with a venting valve (42). The venting valve (42) is an expansion valve having a variable opening degree. The venting valve (42) is an electronic expansion valve that has its opening degree adjusted based on a pulse signal.

<Cooling Heat Exchanger>

The cooling heat exchanger (28) has a high-pressure flow path (28a) and a low-pressure flow path (28b). The cooling heat exchanger (28) exchanges heat between the refrigerant in the high-pressure flow path (28a) and the refrigerant in the low-pressure flow path (28b). In other words, the cooling heat exchanger (28) cools the refrigerant flowing through the high-pressure flow path (28a) using the refrigerant flowing through the low-pressure flow path (28a).

The low-pressure flow path (28b) forms part of an injection flow path (43). The injection flow path (43) includes an upstream flow path (44) and a downstream flow path (45).

One end of the upstream flow path (44) is connected to a portion of the third pipe (40c) upstream of the junction with the fourth pipe (40d). The other end of the upstream flow path (44) is connected to an inflow end of the low-pressure flow path (28b). The upstream flow path (44) is provided with an injection valve (46). The injection valve (46) is an expansion valve having a variable opening degree. The injection valve (46) is an electronic expansion valve that has its opening degree adjusted based on a pulse signal.

One end of the downstream flow path (45) is connected to an outflow end of the low-pressure flow path (28b). The other end of the downstream flow path (45) is connected to the intermediate flow path (18).

<Intercooler>

The intercooler (29) is provided in the intermediate flow path (18). The intercooler (29) is a fin-and-tube air heat exchanger. A cooling fan (29a) is arranged near the intercooler (29). The intercooler (29) exchanges heat between the refrigerant flowing therethrough and the outdoor air transferred from the cooling fan (29a).

<Oil Separation Circuit>

The heat source circuit (11) includes an oil separation circuit. The oil separation circuit includes an oil separator (50), a first oil return pipe (51), and a second oil return pipe (52).

The oil separator (50) is connected to the third discharge pipe (23b). The oil separator (50) separates oil from the refrigerant discharged from the compression element (20). Inflow ends of the first and second oil return pipes (51) and (52) communicate with the oil separator (50). An outflow end of the first oil return pipe (51) is connected to the intermediate flow path (18). The first oil return pipe (51) is provided with a first oil level control valve (53).

An outflow portion of the second oil return pipe (52) branches into a first branch pipe (52a) and a second branch pipe (52b). The first branch pipe (52a) is connected to an oil reservoir of the first compressor (21). The second branch pipe (52b) is connected to an oil reservoir of the second compressor (22). The first branch pipe (52a) is provided with a second oil level control valve (54). The second branch pipe (52b) is provided with a third oil level control valve (55).

<Bypass Pipe>

The heat source circuit (11) includes a first bypass pipe (56), a second bypass pipe (57), and a third bypass pipe (58). The first bypass pipe (56) is associated with the first compressor (21). The second bypass pipe (57) is associated with the second compressor (22). The third bypass pipe (58) is associated with the third compressor (23).

Specifically, the first bypass pipe (56) directly connects the first suction pipe (21a) and the first discharge pipe (21b) together. The second bypass pipe (57) directly connects the second suction pipe (22a) and the second discharge pipe (22b) together. The third bypass pipe (58) directly connects the third suction pipe (23a) and the third discharge pipe (23b) together.

<Check Valve>

The heat source circuit (11) includes a plurality of check valves. The plurality of check valves include first to tenth check valves (CV1 to CV10). The check valves (CV1 to CV10) allow the refrigerant to flow in the directions indicated by the respective arrows of FIG. 1, and disallow the refrigerant to flow in the directions opposite thereto.

The first check valve (CV1) is provided in the first discharge pipe (21b). The second check valve (CV2) is provided in the second discharge pipe (22b). The third check valve (CV3) is provided in the third discharge pipe (23b). The fourth check valve (CV4) is provided in the first pipe (40a). The fifth check valve (CV5) is provided in the third pipe (40c). The sixth check valve (CV6) is provided in the fourth pipe (40d). The seventh check valve (CV7) is provided in the fifth pipe (40e). The eighth check valve (CV8) is provided in the first bypass pipe (56). The ninth check valve (CV9) is provided in the second bypass pipe (57). The tenth check valve (CV10) is provided in the third bypass pipe (58).

<Air-Conditioning Unit>

The air-conditioning unit (60) is a first utilization unit installed indoors. The evaporation temperature of the refrigerant in the air-conditioning unit (60) is higher than that of the refrigerant in the refrigeration-facility unit (70). The air-conditioning unit (60) includes an indoor circuit (61) and an indoor fan (62). A liquid end of the indoor circuit (61) is connected to the first liquid connection pipe (2). A gas end of the indoor circuit (61) is connected to the first gas connection pipe (3).

The indoor circuit (61) includes an indoor expansion valve (63) and an indoor heat exchanger (64) in order from the liquid end to the gas end. The indoor expansion valve (63) is an expansion valve having a variable opening degree. The indoor expansion valve (63) is an electronic expansion valve that has its opening degree adjusted based on a pulse signal. The indoor expansion valve (63) corresponds to a first expansion valve of the present disclosure.

The indoor heat exchanger (64) is a fin-and-tube air heat exchanger. The indoor fan (62) is arranged near the indoor heat exchanger (64). The indoor fan (62) transfers indoor air.

The indoor heat exchanger (64) exchanges heat between the refrigerant flowing therethrough and the indoor air transferred by the indoor fan (62).

<Refrigeration-Facility Unit>

The refrigeration-facility unit (70) is a second utilization unit that cools its internal space. The refrigeration-facility unit (70) includes a refrigeration-facility circuit (71) and a refrigeration-facility fan (72). A liquid end of the refrigeration-facility circuit (71) is connected to the second liquid connection pipe (4). A gas end of the refrigeration-facility circuit (71) is connected to the second gas connection pipe (5).

The refrigeration-facility circuit (71) includes a refrigeration-facility expansion valve (73) and a refrigeration-facility heat exchanger (74) in order from the liquid end to the gas end. The refrigeration-facility expansion valve (73) is an expansion valve having a variable opening degree. The refrigeration-facility expansion valve (73) is an electronic expansion valve that has its opening degree adjusted based on a pulse signal.

The refrigeration-facility heat exchanger (74) is a fin-and-tube air heat exchanger. The refrigeration-facility fan (72) is arranged near the refrigeration-facility heat exchanger (74). The refrigeration-facility fan (72) transfers inside air. The refrigeration-facility heat exchanger (74) exchanges heat between the refrigerant flowing therethrough and the inside air transferred by the refrigeration-facility fan (72).

<Sensor>

The refrigeration apparatus (1) has a plurality of sensors. The plurality of sensors include a first pressure sensor (81), a second pressure sensor (82), a third pressure sensor (83), a fourth pressure sensor (84), and a fifth pressure sensor (85).

The first pressure sensor (81) detects the pressure of the refrigerant to be sucked into the first compressor (21). The second pressure sensor (82) detects the pressure of the refrigerant to be sucked into the second compressor (22). The third pressure sensor (83) detects the pressure of the refrigerant in the intermediate flow path (18). The fourth pressure sensor (84) detects the pressure of the refrigerant discharged from the third compressor (23). The fifth pressure sensor (85) detects the pressure of the refrigerant that has flowed out of the gas-liquid separator (25).

<Controller>

The controller (100) includes a microcomputer mounted on a control board, and a memory device (specifically, a semiconductor memory) storing software for operating the microcomputer. The controller (100) controls various components of the refrigeration apparatus (1) based on detection signals of various sensors.

As illustrated in FIG. 2, the controller (100) includes an outdoor controller (101), an indoor controller (102), and a refrigeration-facility controller (103). As illustrated in FIG. 1, the outdoor controller (101) is provided for the heat source unit (10). The indoor controller (102) is provided for the air-conditioning unit (60). The refrigeration-facility controller (103) is provided for the refrigeration-facility unit (70). The outdoor controller (101) is able to communicate with the indoor controller (102) and the refrigeration-facility controller (103).

—Operation—

The operation of the refrigeration apparatus (1) will be described below. Operations of the refrigeration apparatus (1) include a refrigeration-facility operation, a cooling operation, a cooling and refrigeration-facility operation, a heating operation, and a heating and refrigeration-facility operation.

In the refrigeration-facility operation, the refrigeration-facility unit (70) cools inside air, and the air-conditioning unit (60) is stopped. In the cooling operation, the refrigeration-facility unit (70) is stopped, and the air-conditioning unit (60) performs cooling of the indoor space. In the cooling and refrigeration-facility operation, the refrigeration-facility unit (70) cools inside air, and the air-conditioning unit (60) performs cooling of the indoor space. In the heating operation, the refrigeration-facility unit (70) is stopped, and the air-conditioning unit (60) performs heating of the indoor space. In the heating and refrigeration-facility operation, the refrigeration-facility unit (70) cools inside air, and the air-conditioning unit (60) performs heating of the indoor space.

An outline of each of the operations will be described with reference to FIGS. 3 to 7. In the drawings, flows of the refrigerant are indicated by broken arrows, and the flow paths through each of which the refrigerant flows are thickened. In the drawings, the heat exchanger serving as a radiator is hatched, and the heat exchanger serving as an evaporator is dotted.

<Refrigeration-Facility Operation>

Figure 3:
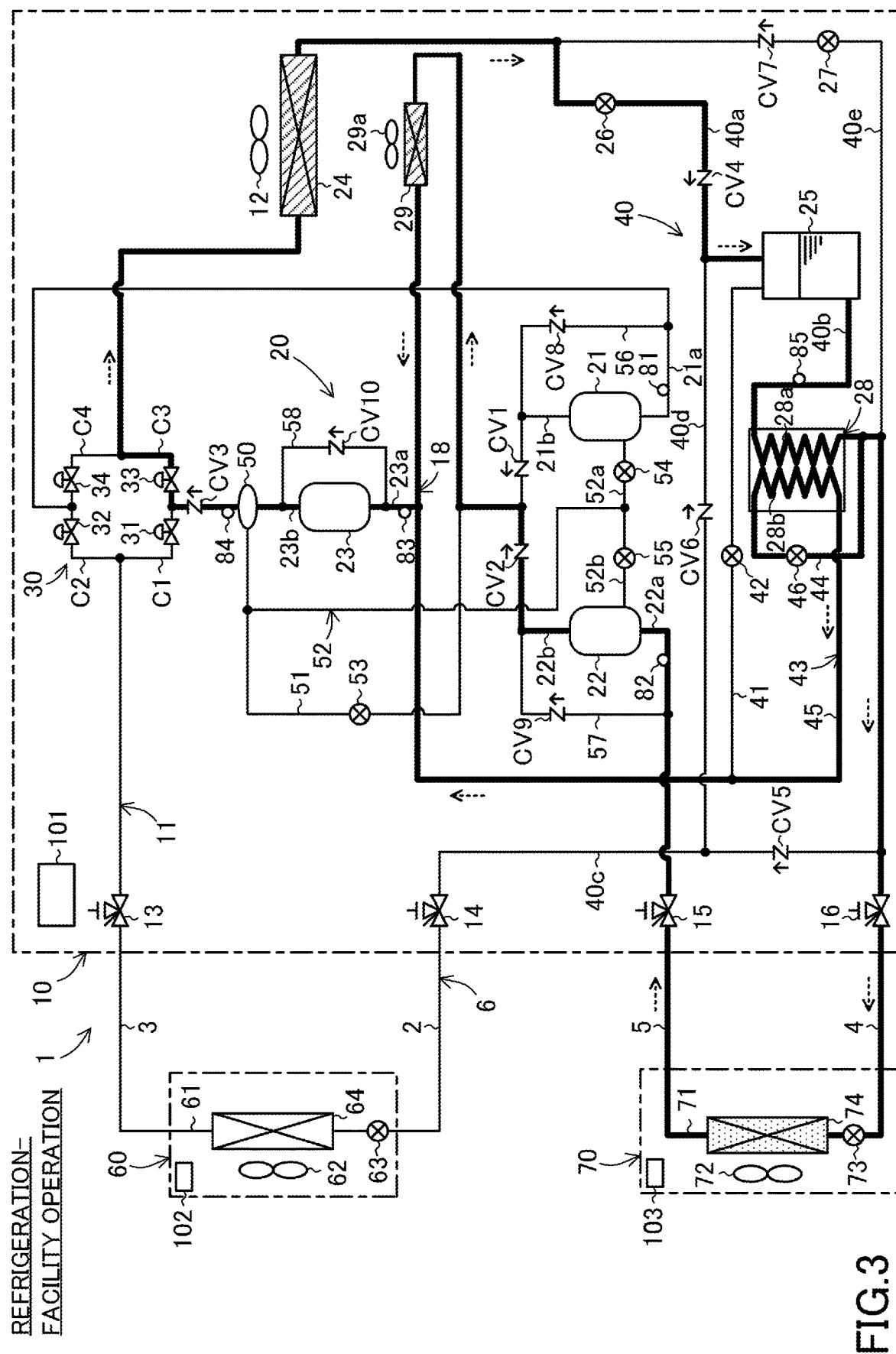
FIG. 3 corresponds to FIG. 1 and illustrates a flow of a refrigerant during a refrigeration-facility operation.

In the refrigeration-facility operation illustrated in FIG. 3, the controller (100) closes the first, second, and fourth on-off valves (31), (32), and (34), and opens the third on-off valve (33). The controller (100) stops the first compressor (21), and operates the second and third compressors (22) and (23). The controller (100) opens the first outdoor expansion valve (26) and the injection valve (46) to a predetermined opening degree, and closes the second outdoor expansion valve (27). The controller (100) closes the indoor expansion valve (63), and adjusts the opening degree of the refrigeration-facility expansion valve (73). The controller (100) operates the outdoor fan (12) and the refrigeration-facility fan (72), and stops the indoor fan (62).

In the refrigeration-facility operation, the refrigeration cycle is performed in which the outdoor heat exchanger (24) functions as a radiator, the function of the indoor heat exchanger (64) is substantially prevented, and the refrigeration-facility heat exchanger (74) functions as an evaporator.

Specifically, the refrigerant compressed by the second compressor (22) is cooled in the intercooler (29), and is then sucked into the third compressor (23). The refrigerant compressed to a pressure equal to or greater than the critical pressure by the third compressor (23) dissipates heat in the outdoor heat exchanger (24), and then passes through the first outdoor expansion valve (26). The first outdoor expansion valve (26) decompresses the refrigerant to a pressure less than the critical pressure.

The refrigerant in a subcritical state flows into the gas-liquid separator (25). The gas-liquid separator (25) separates the refrigerant into a gas refrigerant and a liquid refrigerant.

The liquid refrigerant separated in the gas-liquid separator (25) is cooled in the cooling heat exchanger (28) by the refrigerant flowing through the injection flow path (43). The refrigerant in the injection flow path (43) is sent to the intermediate flow path (18).

The refrigerant cooled by the cooling heat exchanger (28) is sent to the refrigeration-facility unit (70). The refrigerant sent to the refrigeration-facility unit (70) is decompressed by the refrigeration-facility expansion valve (73), and then evaporates in the refrigeration-facility heat exchanger (74). As a result, the inside air is cooled. The refrigerant that has evaporated in the cooling heat exchanger (28) is sucked into the second compressor (22), and is then compressed again.

<Cooling Operation>

Figure 4:
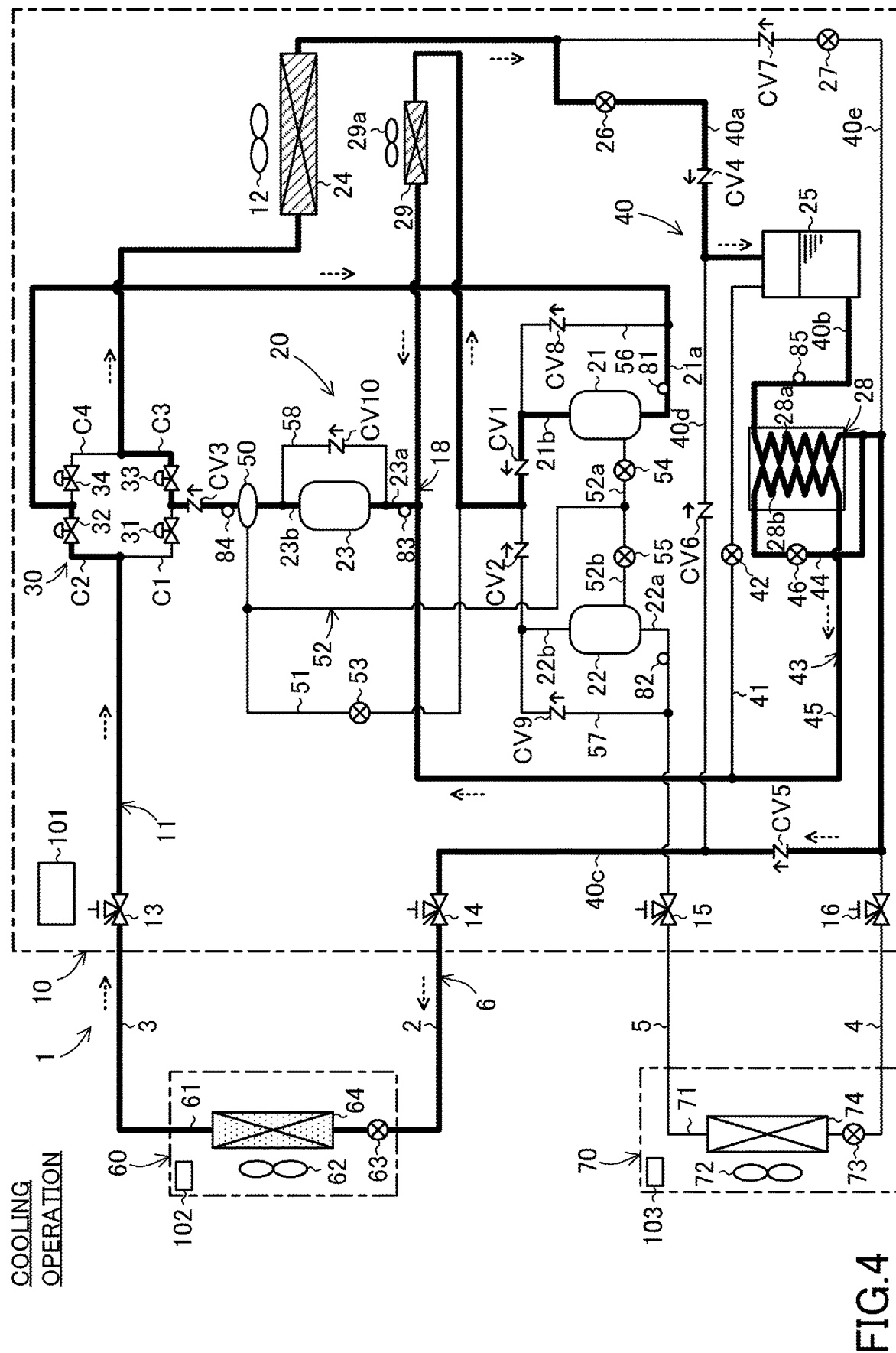
FIG. 4 corresponds to FIG. 1 and illustrates a flow of a refrigerant during a cooling operation.

In the cooling operation illustrated in FIG. 4, the controller (100) closes the first and fourth on-off valves (31) and (34), and opens the second and third on-off valves (32) and (33). The controller (100) stops the second compressor (22), and operates the first and third compressors (21) and (23). The controller (100) opens the first outdoor expansion valve (26) and the injection valve (46) to a predetermined opening degree, and closes the second outdoor expansion valve (27). The controller (100) closes the refrigeration-facility expansion valve (73), and adjusts the opening degree of the indoor expansion valve (63). The controller (100) operates the outdoor fan (12) and the indoor fan (62), and stops the refrigeration-facility fan (72).

In the cooling operation, the refrigeration cycle is performed in which the outdoor heat exchanger (24) functions as a radiator, the indoor heat exchanger (64) functions as an evaporator, and the function of the refrigeration-facility heat exchanger (74) is substantially prevented.

Specifically, the refrigerant compressed by the first compressor (21) is cooled in the intercooler (29), and is then sucked into the third compressor (23). The refrigerant compressed to a pressure equal to or greater than the critical pressure by the third compressor (23) dissipates heat in the outdoor heat exchanger (24), and then passes through the first outdoor expansion valve (26). The first outdoor expansion valve (26) decompresses the refrigerant to a pressure less than the critical pressure.

The refrigerant in a subcritical state flows into the gas-liquid separator (25). The gas-liquid separator (25) separates the refrigerant into a gas refrigerant and a liquid refrigerant.

The liquid refrigerant separated in the gas-liquid separator (25) is cooled in the cooling heat exchanger (28) by the refrigerant flowing through the injection flow path (43). The refrigerant in the injection flow path (43) is sent to the intermediate flow path (18).

The refrigerant cooled by the cooling heat exchanger (28) is sent to the air-conditioning unit (60). The refrigerant sent to the air-conditioning unit (60) is decompressed by the indoor expansion valve (63), and then evaporates in the indoor heat exchanger (64). As a result, the indoor air is cooled. The refrigerant that has evaporated in the indoor heat exchanger (64) is sucked into the first compressor (21), and is then compressed again.

<Cooling and Refrigeration-Facility Operation>

Figure 5:
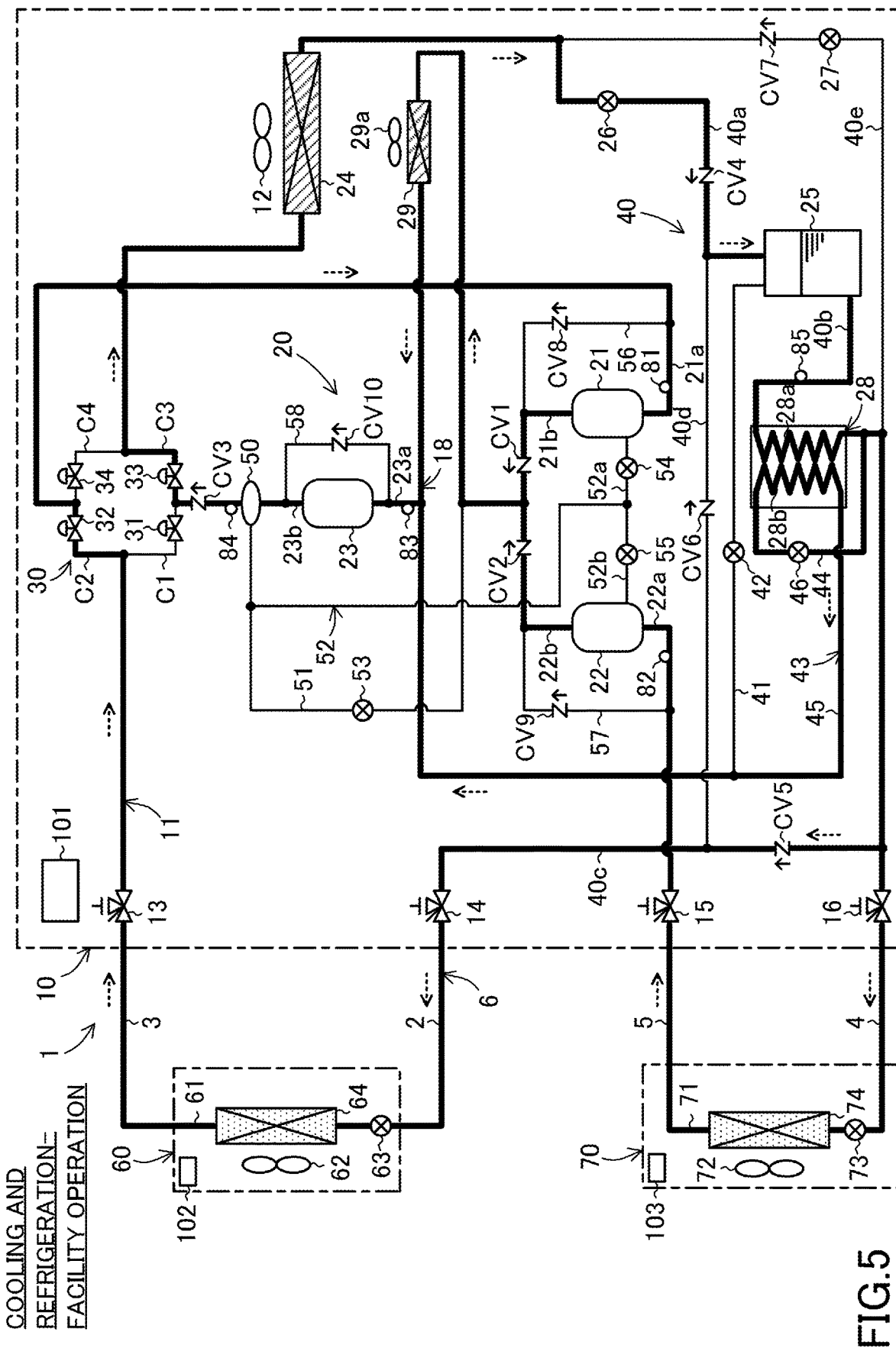
FIG. 5 corresponds to FIG. 1 and illustrates a flow of a refrigerant during a cooling and refrigeration-facility operation.

In the cooling and refrigeration-facility operation illustrated in FIG. 5, the controller (100) closes the first and fourth on-off valves (31) and (34), and opens the second and third on-off valves (32) and (33). The controller (100) operates the first, second, and third compressors (21), (22), and (23). The controller (100) opens the first outdoor expansion valve (26) and the injection valve (46) to a predetermined opening degree, and closes the second outdoor expansion valve (27). The controller (100) adjusts the opening degrees of the refrigeration-facility expansion valve (73) and the indoor expansion valve (63). The controller (100) operates the outdoor fan (12), the indoor fan (62), and the refrigeration-facility fan (72).

In the cooling and refrigeration-facility operation, the refrigeration cycle is performed in which the outdoor heat exchanger (24) functions as a radiator, and the indoor heat exchanger (64) and the refrigeration-facility heat exchanger (74) function as evaporators.

Specifically, the refrigerant compressed by the first and second compressors (21) and (22) is cooled in the intercooler (29), and is then sucked into the third compressor (23). The refrigerant compressed to a pressure equal to or greater than the critical pressure by the third compressor (23) dissipates heat in the outdoor heat exchanger (24), and then passes through the first outdoor expansion valve (26). The first outdoor expansion valve (26) decompresses the refrigerant to a pressure less than the critical pressure.

The refrigerant in a subcritical state flows into the gas-liquid separator (25). The gas-liquid separator (25) separates the refrigerant into a gas refrigerant and a liquid refrigerant.

The liquid refrigerant separated in the gas-liquid separator (25) is cooled in the cooling heat exchanger (28) by the refrigerant flowing through the injection flow path (43). The refrigerant in the injection flow path (43) is sent to the intermediate flow path (18).

The refrigerant cooled by the cooling heat exchanger (28) is sent to the air-conditioning unit (60) and the refrigeration-facility unit (70). The refrigerant sent to the air-conditioning unit (60) is decompressed by the indoor expansion valve (63), and then evaporates in the indoor heat exchanger (64). As a result, the indoor air is cooled. The refrigerant that has evaporated in the indoor heat exchanger (64) is sucked into the first compressor (21), and is then compressed again.

The refrigerant sent to the refrigeration-facility unit (70) is decompressed by the refrigeration-facility expansion valve (73), and then evaporates in the refrigeration-facility heat exchanger (74). As a result, the inside air is cooled. The refrigerant that has evaporated in the cooling heat exchanger (28) is sucked into the second compressor (22), and is then compressed again.

<Heating Operation>

Figure 6:
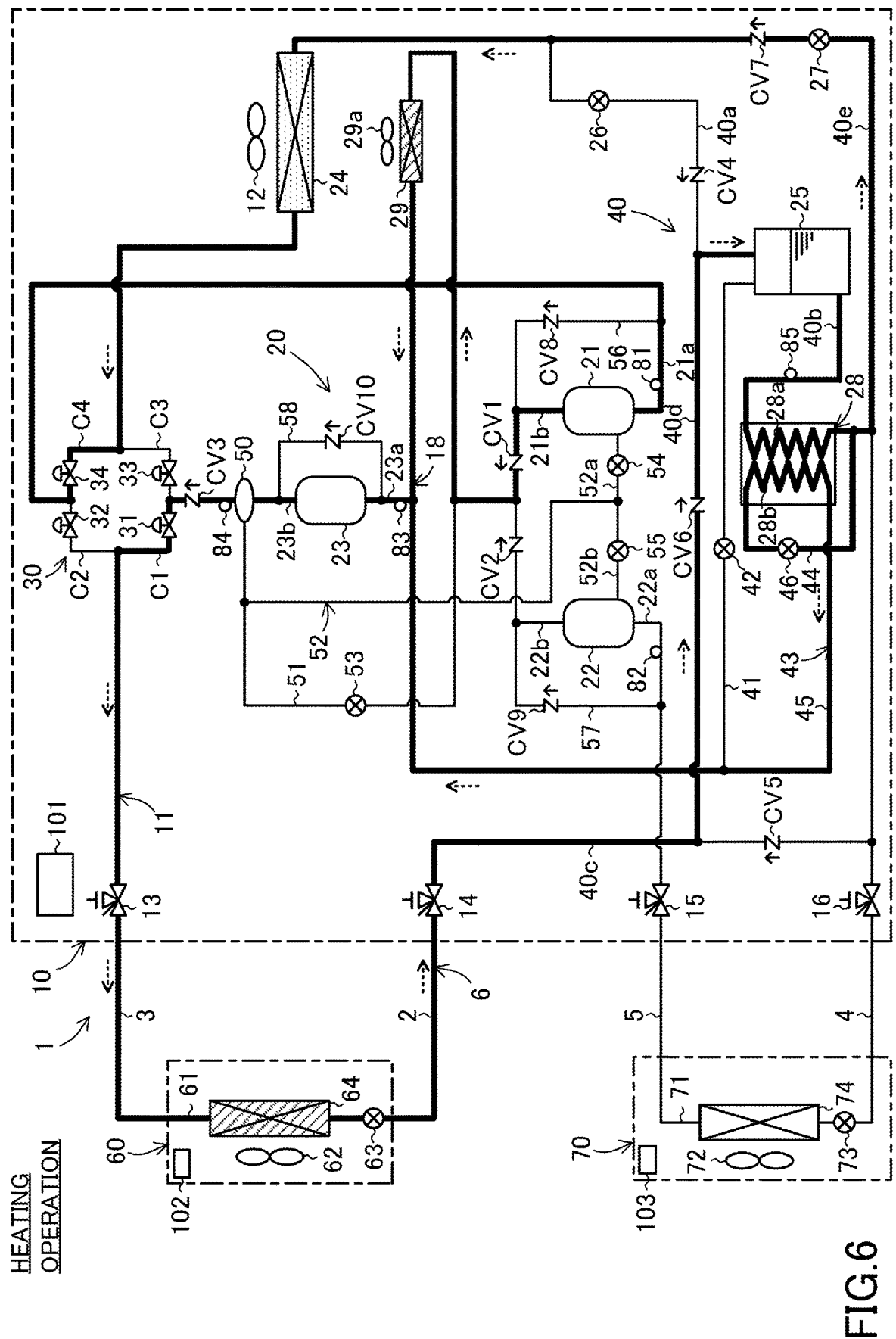
FIG. 6 corresponds to FIG. 1 and illustrates a flow of a refrigerant during a heating operation.

In the heating operation illustrated in FIG. 6, the controller (100) closes the second and third on-off valves (32) and (33), and opens the first and fourth on-off valves (31) and (34). The controller (100) stops the second compressor (22), and operates the first and third compressors (21) and (23). The controller (100) opens the second outdoor expansion valve (27) and the injection valve (46) to a predetermined opening degree, and closes the first outdoor expansion valve (26). The controller (100) closes the refrigeration-facility expansion valve (73), and adjusts the opening degree of the indoor expansion valve (63). The controller (100) operates the outdoor fan (12) and the indoor fan (62), and stops the refrigeration-facility fan (72).

In the heating operation, the refrigeration cycle is performed in which the indoor heat exchanger (64) functions as a radiator, the outdoor heat exchanger (24) functions as an evaporator, and the function of the refrigeration-facility heat exchanger (74) is substantially prevented.

Specifically, the refrigerant compressed by the first compressor (21) is cooled in the intercooler (29), and is then sucked into the third compressor (23). The refrigerant compressed by the third compressor (23) is sent to the air-conditioning unit (60).

The refrigerant sent to the air-conditioning unit (60) dissipates heat in the indoor heat exchanger (64). As a result, the indoor air is heated. The refrigerant that has dissipated heat in the indoor heat exchanger (64) flows into the gas-liquid separator (25). The gas-liquid separator (25) separates the refrigerant into a gas refrigerant and a liquid refrigerant.

The liquid refrigerant separated in the gas-liquid separator (25) is cooled in the cooling heat exchanger (28) by the refrigerant flowing through the injection flow path (43). The refrigerant in the injection flow path (43) is sent to the intermediate flow path (18).

The refrigerant that has been cooled by the cooling heat exchanger (28) is decompressed by the second outdoor expansion valve (27), and then evaporates in the outdoor heat exchanger (24). The refrigerant that has evaporated in the outdoor heat exchanger (24) is sucked into the first compressor (21), and is then compressed again.

<Heating and Refrigeration-Facility Operation>

Figure 7:
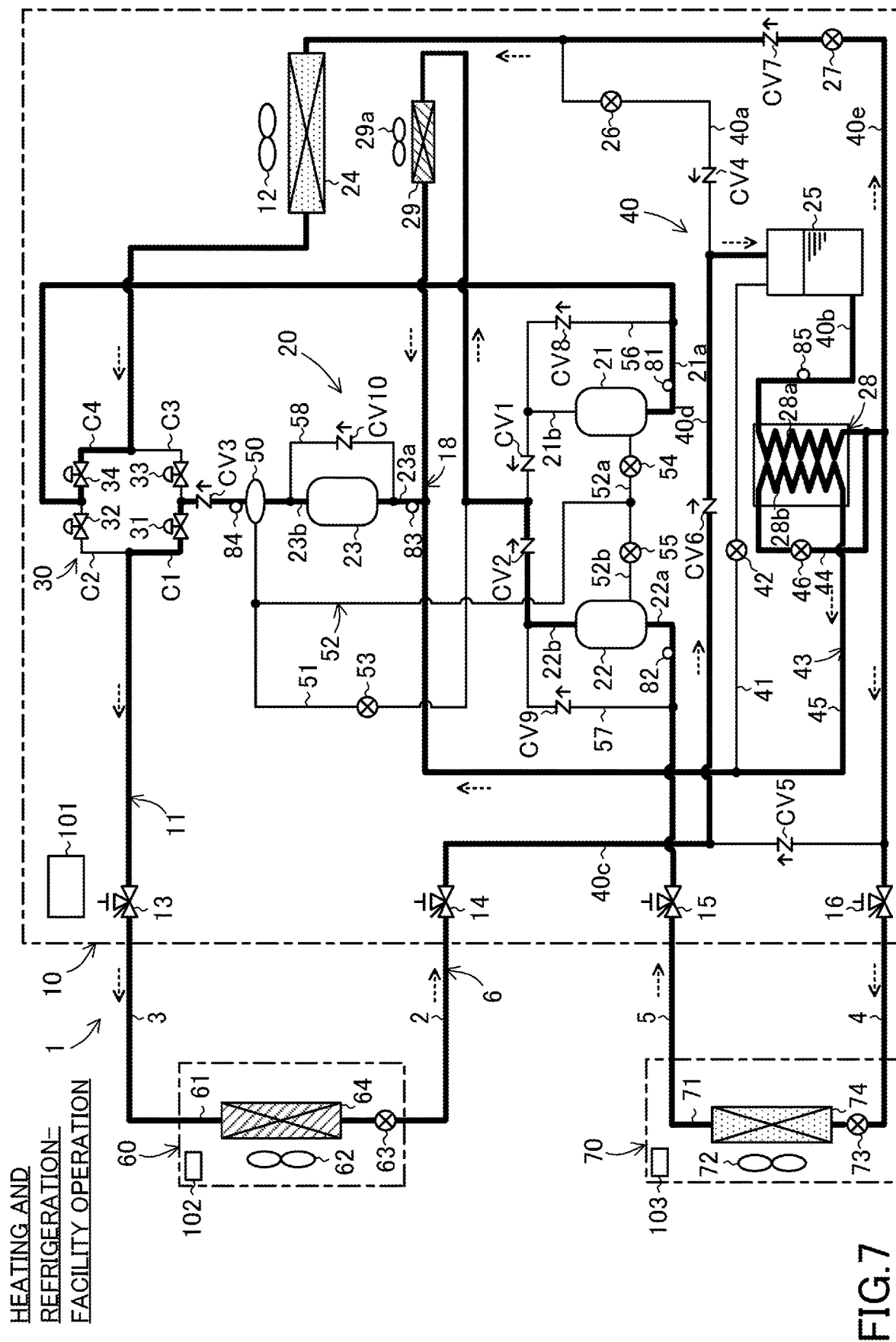
FIG. 7 corresponds to FIG. 1 and illustrates a flow of a refrigerant during a heating and refrigeration-facility operation.

In the heating and refrigeration-facility operation illustrated in FIG. 7, the controller (100) closes the second and third on-off valves (32) and (33), and opens the first and fourth on-off valves (31) and (34). The controller (100) operates the first, second, and third compressors (21), (22), and (23). The controller (100) opens the second outdoor expansion valve (27) and the injection valve (46) to a predetermined opening degree, and closes the first outdoor expansion valve (26). The controller (100) adjusts the opening degrees of the indoor expansion valve (73) and the refrigeration-facility expansion valve (63). The controller (100) operates the outdoor fan (12), the indoor fan (62), and the refrigeration-facility fan (72).

In the heating and refrigeration-facility operation, the refrigeration cycle is performed in which the indoor heat exchanger (64) functions as a radiator, and the outdoor heat exchanger (24) and the refrigeration-facility heat exchanger (74) function as evaporators.

Specifically, the refrigerant compressed by the first and second compressors (21) and (22) is cooled in the intercooler (29), and is then sucked into the third compressor (23). The refrigerant compressed by the third compressor (23) is sent to the air-conditioning unit (60).

The refrigerant sent to the air-conditioning unit (60) dissipates heat in the indoor heat exchanger (64). As a result, the indoor air is heated. The refrigerant that has dissipated heat in the indoor heat exchanger (64) flows into the gas-liquid separator (25). The gas-liquid separator (25) separates the refrigerant into a gas refrigerant and a liquid refrigerant.

The liquid refrigerant separated in the gas-liquid separator (25) is cooled in the cooling heat exchanger (28) by the refrigerant flowing through the injection flow path (43). The refrigerant in the injection flow path (43) is sent to the intermediate flow path (18).

A portion of the refrigerant that has been cooled by the cooling heat exchanger (28) is decompressed by the second outdoor expansion valve (27), and then evaporates in the outdoor heat exchanger (24). The refrigerant that has evaporated in the outdoor heat exchanger (24) is sucked into the first compressor (21), and is then compressed again.

The remaining portion of the refrigerant that has been cooled by the cooling heat exchanger (28) is sent to the refrigeration-facility unit (70). The refrigerant sent to the refrigeration-facility unit (70) is decompressed by the refrigeration-facility expansion valve (73), and then evaporates in the refrigeration-facility heat exchanger (74). As a result, the inside air is cooled. The refrigerant that has evaporated in the cooling heat exchanger (28) is sucked into the second compressor (22), and is then compressed again.

—Another Control During Cooling and Refrigeration-Facility Operation—

In the cooling and refrigeration-facility operation described above, the outdoor controller (101) performs the following control.

The outdoor controller (101) adjusts the opening degree of the venting valve (42). Specifically, the outdoor controller (101) adjusts the opening degree of the venting valve (42) so that the pressure (RP) detected by the fifth pressure sensor (85) is equal to a target pressure less than the critical pressure. The pressure (RP) corresponds to the internal pressure of the gas-liquid separator (25).

Figure 8:
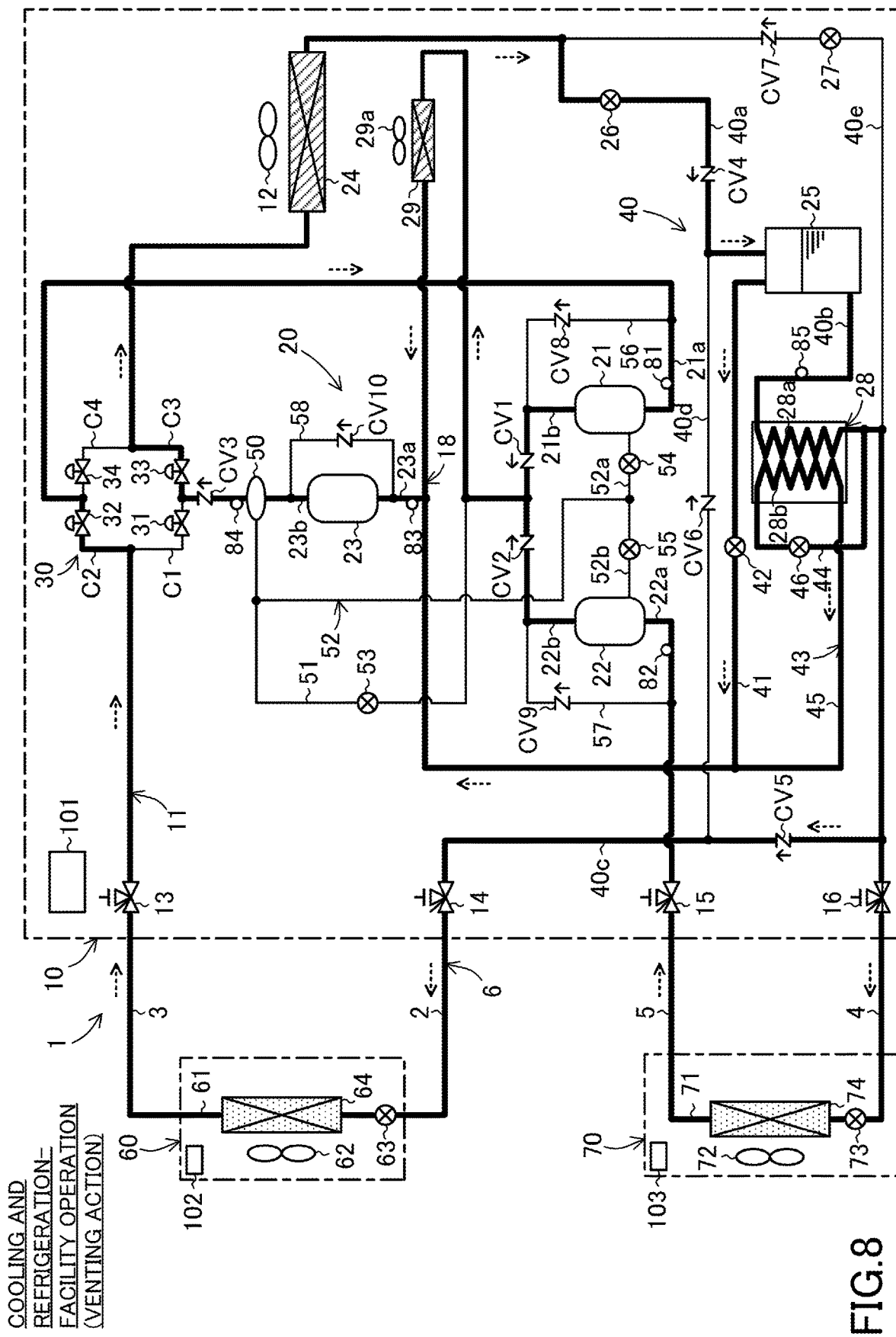
FIG. 8 corresponds to FIG. 1 and further illustrates a flow of a refrigerant during a venting action of the cooling and refrigeration-facility operation.

As illustrated in FIG. 8, the venting valve (42) opening causes the gas refrigerant in the gas-liquid separator (25) to flow through the venting pipe (41). The refrigerant in the venting pipe (41) flows through the venting pipe (41), and is sent to the intermediate flow path (18).

Performing an action of releasing the gas refrigerant in the gas-liquid separator (25) as described above (hereinafter referred to also as the "venting action") can lower the internal pressure of the gas-liquid separator (25) to a pressure less than the critical pressure. Thus, the refrigerant in the subcritical state can be accumulated in the gas-liquid separator (25), which can separate the refrigerant into a gas refrigerant and a liquid refrigerant.

The outdoor controller (101) adjusts the opening degree of the first outdoor expansion valve (26). Specifically, if the pressure (RP) does not reach the target pressure even with the opening degree of the venting valve (42) adjusted, the outdoor controller (101) reduces the opening degree of the first outdoor expansion valve (26). This can lower the internal pressure of the gas-liquid separator (25) to a pressure less than the critical pressure.

The outdoor controller (101) controls the number of revolutions of the first compressor (21) in accordance with the cooling load of the air-conditioning unit (60). Specifically, the outdoor controller (101) calculates a target evaporation pressure in the indoor heat exchanger (64) based on an indoor set temperature. The outdoor controller (101) adjusts the number of revolutions of the first compressor (21) so that the evaporation pressure in the indoor heat exchanger (64) approaches the target evaporation pressure. The evaporation pressure in the indoor heat exchanger (64) herein corresponds to the suction pressure of the first compressor (21) detected by the first pressure sensor (81).

The outdoor controller (101) controls the number of revolutions of the second compressor (22) in accordance with the cooling load of the refrigeration-facility unit (70). Specifically, the outdoor controller (101) calculates a target evaporation pressure in the refrigeration-facility heat exchanger (74) based on an inside set temperature. The outdoor controller (101) adjusts the number of revolutions of the second compressor (22) so that the evaporation pressure in the refrigeration-facility heat exchanger (74) approaches the target evaporation pressure. The evaporation pressure in the refrigeration-facility heat exchanger (74) herein corresponds to the suction pressure of the second compressor (22) detected by the second pressure sensor (82).

—Problem About Cooling and Refrigeration-Facility Operation—

An increase in the outdoor air temperature in the summer season or for any other reason prevents a venting action from being adequately performed, and thus causes an increase in the internal pressure of the gas-liquid separator (25) (the pressure (RP) described above), resulting in an excessive increase in the high pressure of the refrigerant circuit. This problem will be described below.

In the cooling and refrigeration-facility operation, the refrigerant dissipates heat in the outdoor heat exchanger (24). To allow the refrigerant to dissipate heat in the outdoor heat exchanger (24), the temperature of the refrigerant flowing through the outdoor heat exchanger (24) needs to be higher than the outdoor air temperature. In particular, in the refrigeration cycle in which the refrigerant has a pressure equal to or greater than the critical pressure, the temperature of the refrigerant varies in the entire area of the outdoor heat exchanger (24) from the inlet to the outlet. Thus, the temperature of the refrigerant needs to be higher in the entire area of the outdoor heat exchanger (24) than that of outside air.

The cooling and refrigeration-facility operation performed under the condition that the outdoor air temperature is high increases the high pressure for the above-described reason. The increase in the high pressure causes an increase in the internal pressure of the gas-liquid separator (25). In this case, sending the gas refrigerant in the gas-liquid separator (25) to the intermediate flow path (18) through the venting action described above can lower the internal pressure of the gas-liquid separator (25).

Meanwhile, continuously performing the venting action during the cooling and refrigeration-facility operation increases the pressure of the intermediate flow path (18). Thus, a sufficiently large difference cannot be made between the internal pressure of the gas-liquid separator (25) and the pressure of the intermediate flow path (18). This prevents the gas refrigerant in the gas-liquid separator (25) from being adequately sent to the intermediate flow path (18).

The gas in the gas-liquid separator (25) prevented from being adequately released as described above causes the internal pressure of the gas-liquid separator (25) to exceed the target pressure, resulting in an excessive increase in the high pressure. In particular, if the opening degree of the first outdoor expansion valve (26) is reduced to lower the internal pressure of the gas-liquid separator (25) to the critical pressure or lower, the high pressure further increases. As a result, the high pressure increases excessively, leading to an abnormal high pressure. This prevents operation from being continued.

—Control of Cooling and Refrigeration-Facility Operation—

In order to solve the above problem, the following control is performed during the cooling and refrigeration-facility operation. This control will be described with reference to FIGS. 9 to 12.

Figure 9:
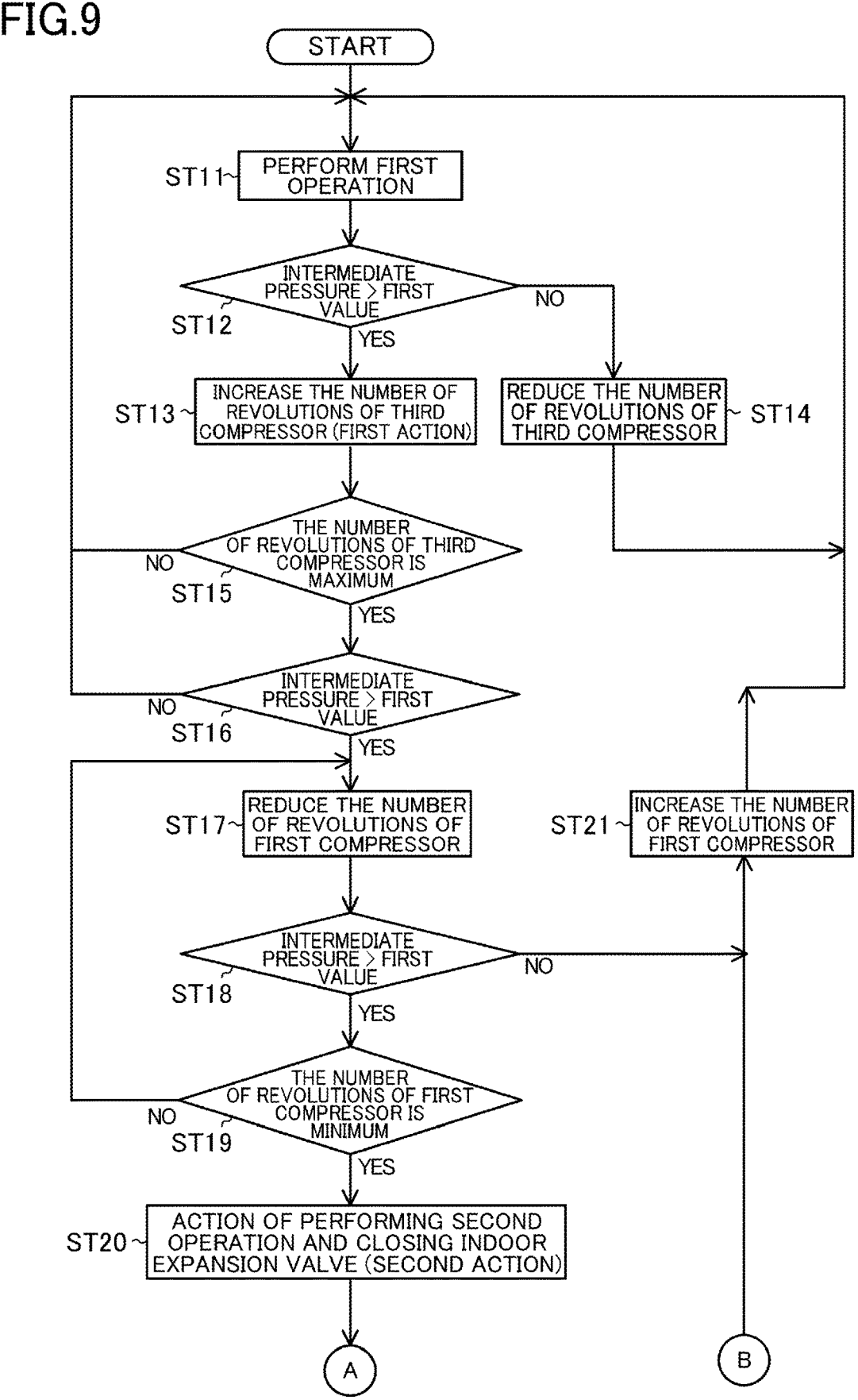
FIG. 9 is a first flowchart showing control to be performed during the cooling and refrigeration-facility operation.

As shown in FIG. 9, at the start of the cooling and refrigeration-facility operation, in step ST11, the outdoor controller (101) executes a first operation in which the first, second, and third compressors (21), (22), and (23) are operated. In this way, the cooling and refrigeration-facility operation described above is performed.

Meanwhile, performing the cooling and refrigeration-facility operation under the condition that the outdoor air temperature is high causes the venting action to be continuously performed. This increases the intermediate pressure of the intermediate flow path (18). The intermediate pressure is detected by the third pressure sensor (83). If, in step ST12, the condition that the intermediate pressure is greater than a predetermined value (first value) is satisfied, the outdoor controller (101) executes an action (first action) of increasing the number of revolutions of the third compressor (23) (step ST13). If, in step ST12, the condition that the intermediate pressure is greater than the first value is not satisfied, the outdoor controller (101) reduces the number of revolutions of the third compressor (23) (step ST14). The condition that the intermediate pressure is greater than the predetermined value (first value) in step ST12 corresponds a first condition of the present disclosure.

The control allows the intermediate pressure to approach the first value, thus keeping the intermediate pressure from being less than the first value. Thus, a sufficiently large difference can be made between the internal pressure of the gas-liquid separator (25) and the intermediate pressure. This can make it easier to release the gas refrigerant in the gas-liquid separator (25).

If, in step ST15, the number of revolutions of the third compressor (23) reaches its maximum value, and in step S16, the intermediate pressure is still greater than the first value, the outdoor controller (101) reduces the number of revolutions of the first compressor (21) in step ST17. Specifically, the outdoor controller (101) lowers the upper limit of the range in which the number of revolutions of the first compressor (21) is controlled.

A decrease in the number of revolutions of the first compressor (21) reduces the flow rate of the refrigerant discharged from the first compressor (21). This can lower the pressure of the intermediate flow path (18), and can make it easier to release the gas refrigerant in the gas-liquid separator (25).

The decrease in the number of revolutions of the first compressor (21) causes the air-conditioning unit (60) to have a lower air-conditioning cooling capacity. Strictly speaking, the decrease in the upper limit of the range in which the number of revolutions of the first compressor (21) is controlled causes the air-conditioning cooling capacity of the air-conditioning unit (60) to be limited. However, in the foregoing state, the cooling capacity of the refrigeration-facility unit (70) is neither reduced nor limited. This allows an inside object to be preferentially cooled with reliability.

If, in step ST18, the intermediate pressure is still greater than the first value, and in step ST19, the number of revolutions of the first compressor (21) has reached its minimum value, control in step ST20 is executed. If, in step ST19, the number of revolutions of the first compressor (21) has not reached its minimum value, the control in step ST17 is executed again.

In step ST20, the outdoor controller (101) executes a second action. The second action is an action of performing a second operation in which the first compressor (21) is stopped and the second and third compressors (22) and (23) are operated, and outputting a signal for closing the indoor expansion valve (63). This signal is input to the indoor controller (102). The indoor controller (102) closes the indoor expansion valve (63) based on the input signal. As a result, after the second action, an operation similar to the refrigeration-facility operation illustrated in FIG. 3 is basically performed. However, in the second action, the outdoor controller (101) opens the second on-off valve (32) of the flow path switching mechanism (30) in one preferred embodiment.

The first compressor (21) stopped along with the second operation can further lower the pressure of the intermediate flow path (18), and can make it easier to release the gas refrigerant in the gas-liquid separator (25).

The first compressor (21) stopped causes the air-conditioning unit (60) to stop. However, the cooling capacity of the refrigeration-facility unit (70) is neither reduced nor limited. This allows an inside object to be preferentially cooled with reliability.

If, in step ST18, the intermediate pressure is equal to or less than the first value, control in step ST21 is executed. In step ST21, the outdoor controller (101) increases the number of revolutions of the first compressor (21). Specifically, the outdoor controller (101) raises the upper limit of the range in which the number of revolutions of the first compressor (21) is controlled.

Figure 10:
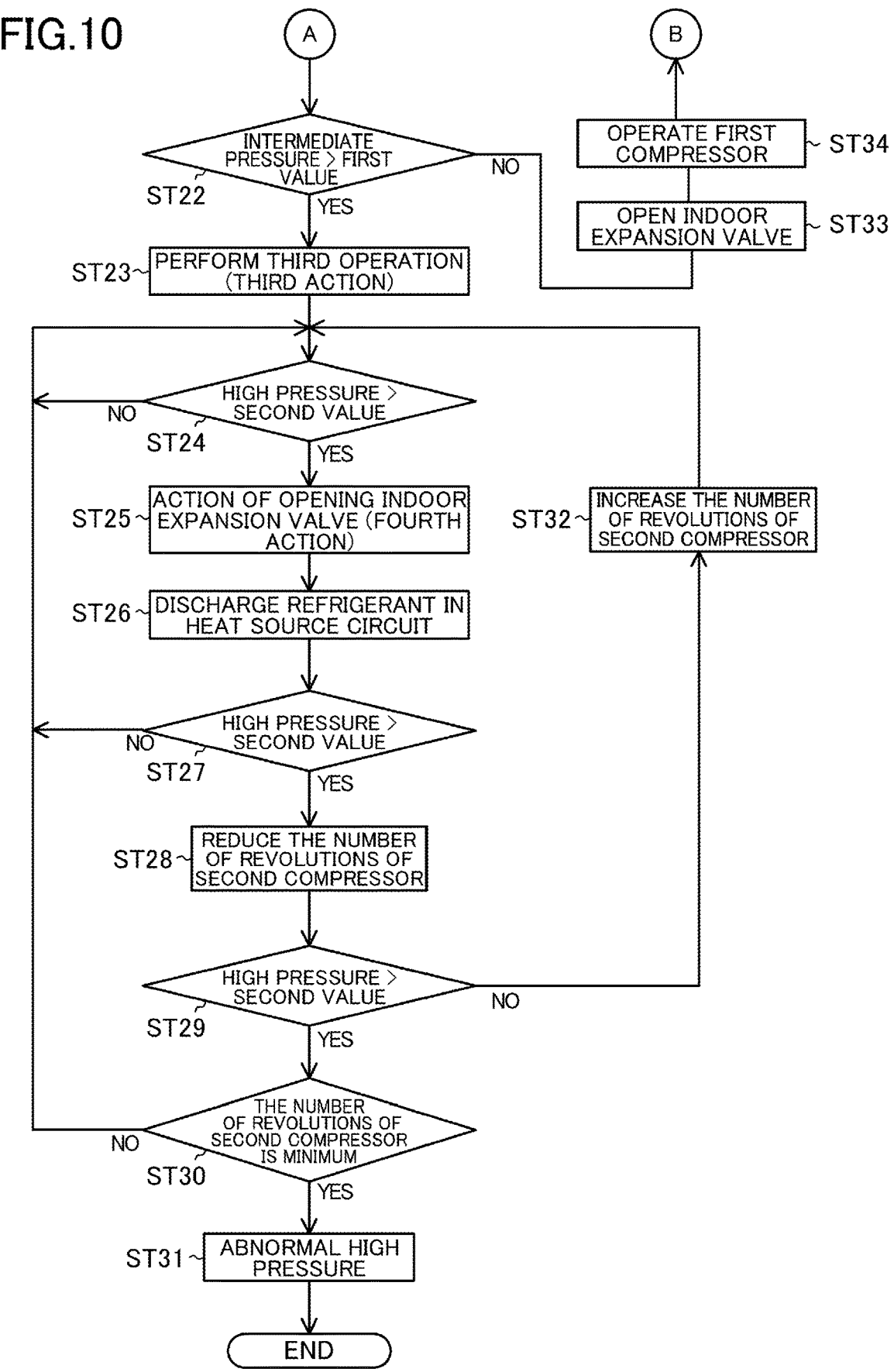
FIG. 10 is a second flowchart showing the control to be performed during the cooling and refrigeration-facility operation.

If, in step ST22 of FIG. 10, the intermediate pressure is still greater than the first value, the outdoor controller (101) executes a third action in step ST23. The third action is an action of performing a third operation in which the first and third compressors (21) and (23) are stopped and the second compressor (22) is operated. Specifically, the outdoor controller (101) stops all of the compressors (21, 22, 23), and then operates only the second compressor (22).

If, in step ST22, the intermediate pressure is equal to or less than the first value, the outdoor controller (101) opens the indoor expansion valve (63) to a predetermined opening degree (step ST33), and again operates the first compressor (21) (step ST34). Thereafter, the first operation is restarted after step ST21 in FIG. 9.

Figure 11:
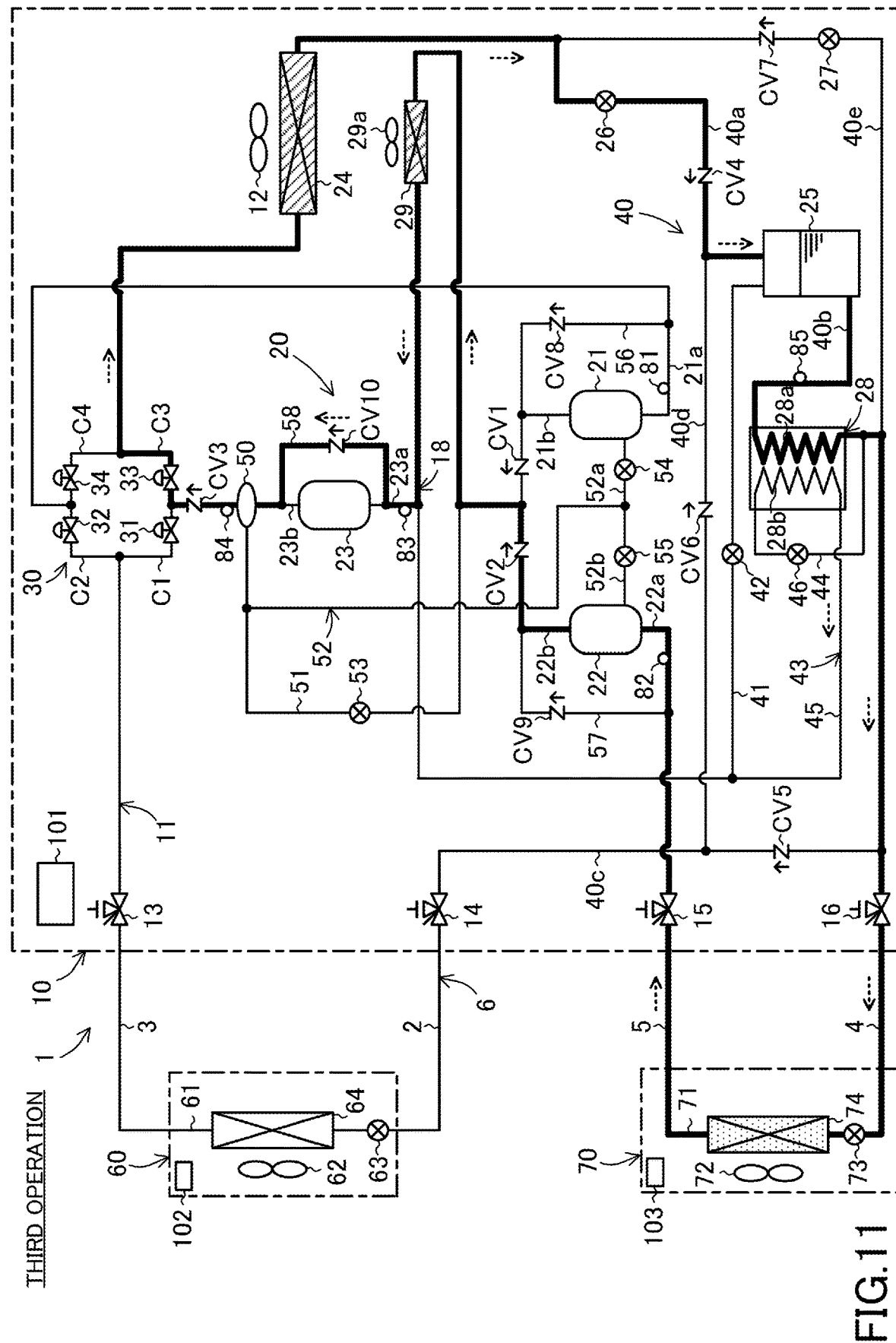
FIG. 11 corresponds to FIG. 1 and further illustrates a flow of a refrigerant during a third operation.

As illustrated in FIG. 11, the third operation performed causes the refrigerant compressed by the second compressor (22) to be cooled in the intercooler (29) and then to flow through the third bypass pipe (58). In other words, the refrigerant compressed by the second compressor (22) bypasses the third compressor (23) at rest. The refrigerant compressed by the second compressor (22) dissipates heat in the outdoor heat exchanger (24), and evaporates in the refrigeration-facility heat exchanger (74).

In the third operation, the refrigerant is compressed in a single stage only by the second compressor (22). This causes the intermediate flow path (18) to have a substantially high pressure. Thus, the outdoor controller (101) closes the venting valve (42) and the injection valve (46). For this reason, the venting action is not performed. In the third operation, pausing the third compressor (23) can keep the high pressure from increasing.

If, in step ST24, the condition that the high pressure of the refrigerant circuit (6) is greater than a predetermined value (second value) is satisfied, the outdoor controller (101) executes a fourth action in step ST25. The high pressure of the refrigerant circuit (6) herein corresponds to the pressure of the refrigerant discharged from the second compressor (22). In the third operation, the high pressure of the refrigerant circuit (6) is detected by the third pressure sensor (83) or the fourth pressure sensor (84). The condition that the high pressure of the refrigerant circuit (6) is greater than the predetermined value (second value) in step ST24 corresponds a second condition of the present disclosure.

The fourth action is an action of outputting a signal for opening the indoor expansion valve (63). This signal is input to the indoor controller (102). The indoor controller (102) opens the indoor expansion valve (63) based on the input signal. The high pressure of the refrigerant circuit (6) is detected by the third pressure sensor (83).

The indoor expansion valve (63) opened through the fourth action causes the refrigerant in the heat source circuit (11) to be discharged (step ST26).

In the operation performed after the second action described above (corresponding to the refrigeration-facility operation in FIG. 3), the indoor expansion valve (63) is closed. Thus, a pipe from the indoor expansion valve (63) to the suction side of the third compressor (23) (strictly speaking, a pipe from the indoor expansion valve (63) to the first check valve (CV1)) has a lower pressure than the first liquid connection pipe (2) does.

Figure 12:
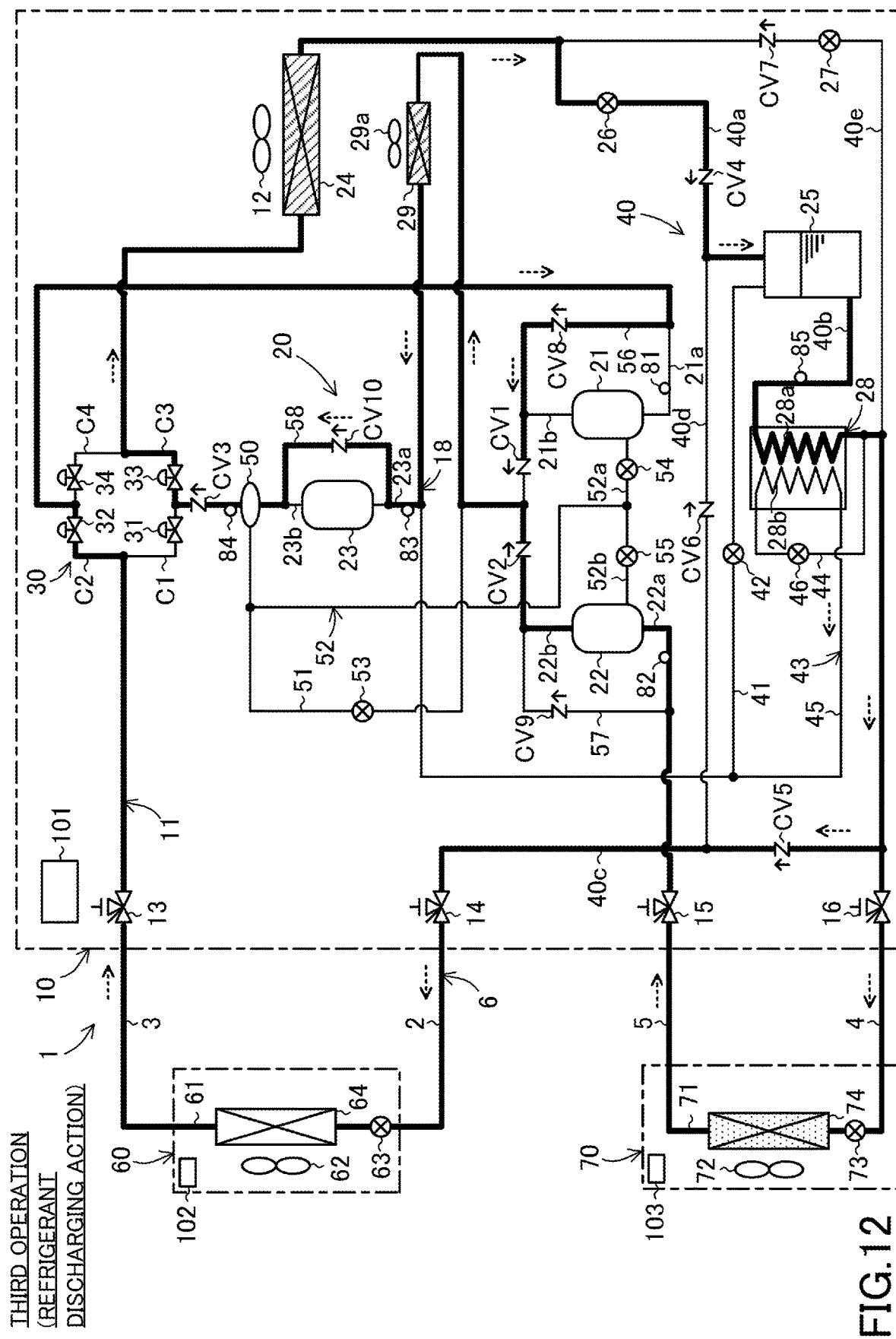
FIG. 12 corresponds to FIG. 1 and further illustrates a flow of a refrigerant during a refrigerant discharging action of the third operation.

The indoor expansion valve (63) opened from this state in step ST25 causes a portion of the liquid refrigerant in the liquid side flow path (40) of the heat source circuit (11) to flow through the first liquid connection pipe (2) into the pipe as illustrated in FIG. 12. The refrigerant is sent through the first bypass pipe (56) to just before the first check valve (CV1). As a result, the high pressure of the heat source circuit (11) can be lowered.

If, in step ST27, the condition that the high pressure of the refrigerant circuit (6) is greater than the predetermined value (second value) is still satisfied, the outdoor controller (101) reduces the number of revolutions of the second compressor (22) in step ST28. Specifically, the outdoor controller (101) lowers the upper limit of the range in which the number of revolutions of the second compressor (22) is controlled.

If, in step ST29, the high pressure is still greater than the second value, and in step ST30, the number of revolutions of the second compressor (22) has reached its minimum value, the outdoor controller (101) determines in step ST31 that the high pressure is abnormal. In this case, the outdoor controller (101) stops the second compressor (22), and deactivates the refrigeration apparatus (1).

If, in step ST29, the high pressure is equal to or less than the second value, the outdoor controller (101) increases the number of revolutions of the second compressor (22) in step ST32. Specifically, the outdoor controller (101) raises the upper limit of the range in which the number of revolutions of the second compressor (22) is controlled.

Features of Embodiment

The outdoor heat exchanger (24) corresponds to a radiator of the present disclosure. The indoor expansion valve (63) corresponds to a first expansion valve of the present disclosure. The venting valve (42) corresponds to a first valve of the present disclosure. The outdoor controller (101) corresponds to a control unit of the present disclosure.

In the embodiment, if the first condition that the intermediate pressure corresponding to the pressure of the intermediate flow path (18) is greater than the first value is satisfied in the cooling and refrigeration-facility operation, the outdoor controller (101) executes the first action of increasing the number of revolutions of the third compressor (23).

Thus, the intermediate pressure of the intermediate flow path (18) can be controlled to be equal to or less than the first value, and a sufficiently large difference can be made between the internal pressure of the gas-liquid separator (25) and the intermediate pressure. This allows the gas refrigerant in the gas-liquid separator (25) to be released to the intermediate flow path (18) via the venting pipe (41). This can lower the internal pressure of the gas-liquid separator (25).

Lowering the internal pressure of the gas-liquid separator (25) allows the refrigerant in the gas-liquid separator (25) to be in the subcritical state. Thus, the gas-liquid separator (25) can reliably separate the refrigerant into the gas refrigerant and the liquid refrigerant.

Adjusting the internal pressure of the gas-liquid separator (25) to the target pressure less than the critical pressure through the venting action reduces the pressure at which the first outdoor expansion valve (26) decompresses the refrigerant. Thus, the opening degree of the first outdoor expansion valve (26) can be increased, thereby lowering the high pressure.

In the embodiment, if the first condition is satisfied after the first action, the outdoor controller (101) reduces the number of revolutions of the first compressor (21).

Reducing the number of revolutions of the first compressor (21) can further lower the intermediate pressure of the intermediate flow path (18). Even if the decrease in the number of revolutions of the first compressor (21) lowers the air-conditioning cooling capacity of the air-conditioning unit (60), the cooling capacity of the refrigeration-facility unit (70) does not decrease. This allows an inside object to be preferentially cooled with reliability. Thus, the quality of the inside object can be maintained.

In the embodiment, if the first condition is satisfied after the first action, the outdoor controller (101) executes the second action of performing the second operation in which the first compressor (21) is stopped and the second and third compressors (22) and (23) are operated, and outputting the signal for closing the indoor expansion valve (63) associated with the air-conditioning unit (60) to the air-conditioning unit (60).

Pausing the first compressor (21) can further lower the intermediate pressure of the intermediate flow path (18). As a result, the air-conditioning unit (60) is stopped, buy the cooling capacity of the refrigeration-facility unit (70) does not decrease. This allows an inside object to be preferentially cooled with reliability. Thus, the quality of the inside object can be maintained.

In the embodiment, if the second condition that the discharge pressure (high pressure) of the second compressor (22) is greater than the second value is satisfied after the third action, the outdoor controller (101) executes the fourth action of outputting the signal for opening the indoor expansion valve (63) to the air-conditioning unit (60).

Opening the indoor expansion valve (63) causes the refrigerant in the heat source circuit (11) to be sent to the pipe from the indoor expansion valve (63) to the suction side of the third compressor (23). Specifically, the refrigerant in the heat source circuit (11) can be sent to the pipe from the indoor expansion valve (63) to the first check valve (CV1). This can further lower the high pressure.

The intermediate flow path (18) includes the intercooler (29) on the downstream side of the first discharge pipe (21b). Thus, if the cooling and refrigeration-facility operation is restarted, the liquid refrigerant stored in the pipe can be evaporated in the intercooler (29). This can keep the liquid refrigerant from being sucked into the third compressor (23).

In the embodiment, if the second condition is satisfied after the fourth action, the outdoor controller (101) reduces the number of revolutions of the second compressor (22).

Reducing the number of revolutions of the second compressor (22) can further lower the high pressure.

Variations of Embodiment

A controller (100) of a variation is different from the controller (100) of the foregoing embodiment. In other words, control to be performed during a cooling and refrigeration-facility operation of the variation is different from control to be performed during the cooling and refrigeration-facility operation of the foregoing embodiment.

In the cooling and refrigeration-facility operation of the variation, steps ST11 to ST21 illustrated in FIG. 9 are executed just like the embodiment. Thus, if the intermediate pressure is greater than the first value, the outdoor controller (101) increases the number of revolutions of the second compressor (22) (step ST13), then reduces the number of revolutions of the first compressor (21), and subsequently executes the second action.

In the second action of the foregoing embodiment, the outdoor controller (101) opens the second on-off valve (32) of the flow path switching mechanism (30). Thus, in the operation after the second action, the pipe from the closed indoor expansion valve (63) to the first check valve (CV1)) has a lower pressure than the first liquid connection pipe (2) does.

Figure 13:
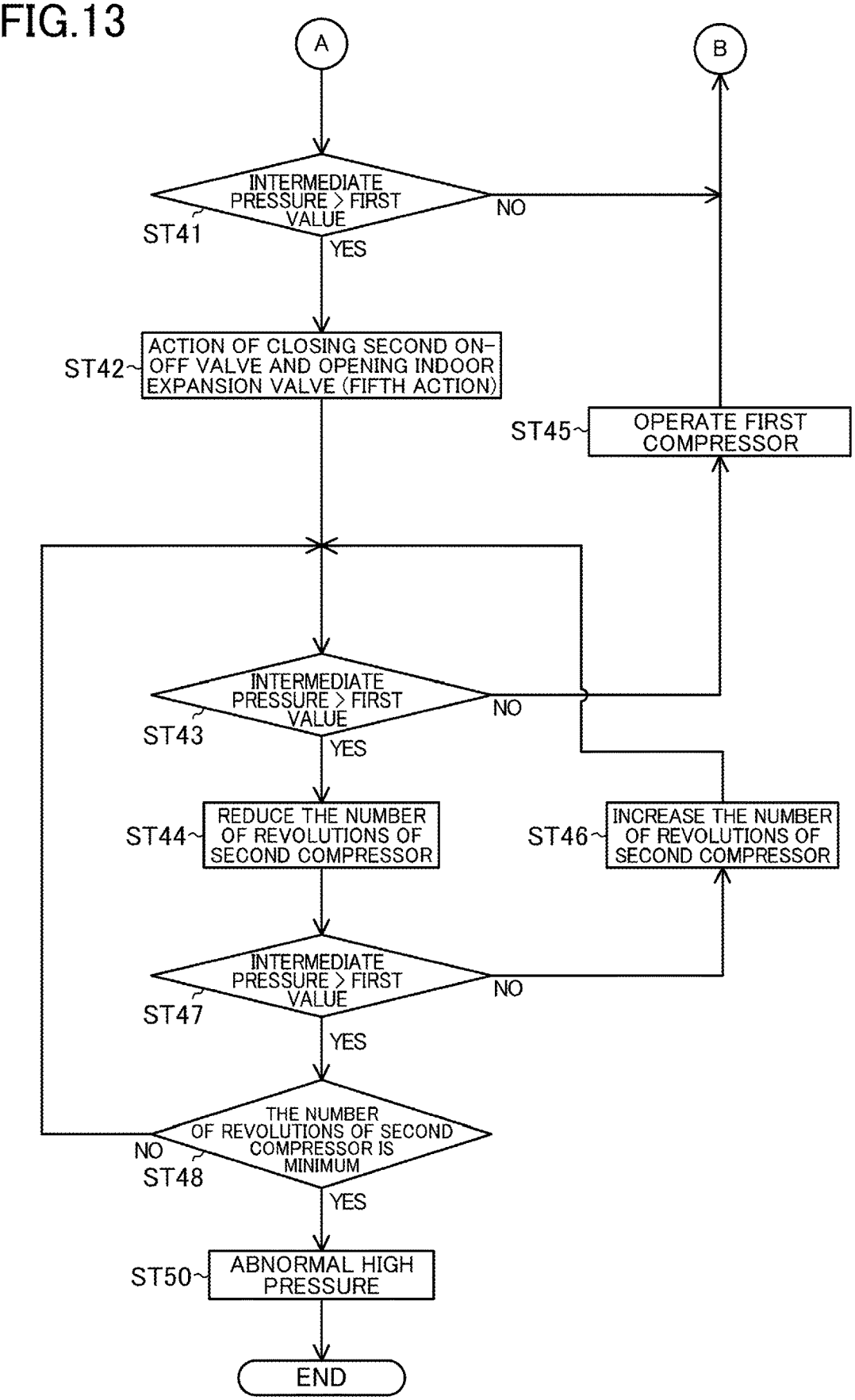
FIG. 13 is a flowchart showing control according to a variation of the embodiment.

In contrast, in the variation, if, after step ST20, the intermediate pressure is still greater than the first value in step ST41 illustrated in FIG. 13, the outdoor controller (101) executes a fifth action in step ST42.

The fifth action is an action of closing the second on-off valve (32) of the flow path switching mechanism (30), and outputting a signal for opening the indoor expansion valve (63). This signal is input to the indoor controller (102). The indoor controller (102) opens the indoor expansion valve (63) based on the input signal.

Opening the indoor expansion valve (63) causes the refrigerant in the heat source circuit (11) to be sent to the pipe from the open indoor expansion valve (63) to the closed second on-off valve (32). This can further lower the high pressure while the second and third compressors (22) and (23) are operated.

If, in step ST41, the intermediate pressure is equal to or less than the first value, control in step ST21 of FIG. 9 is executed.

If, in step ST43, the intermediate pressure is still greater than the first value, the outdoor controller (101) reduces the number of revolutions of the second compressor (22) in step ST44. As a result, the flow rate of the refrigerant discharged from the second compressor (22) decreases. This can lower the intermediate pressure.

If, in step ST43, the intermediate pressure is equal to or less than the first value, the outdoor controller (101) again operates the first compressor (21) (step ST45). Thereafter, the first operation is restarted after step ST21 in FIG. 9.

If, in step ST47, the intermediate pressure is still greater than the first value, and in step ST48, the number of revolutions of the second compressor (22) has reached its minimum value, the outdoor controller (101) determines in step ST50 that the high pressure is abnormal. In this case, the outdoor controller (101) stops the second compressor (22), and deactivates the refrigeration apparatus (1).

If, in step ST47, the intermediate pressure is equal to or less than the first value, the outdoor controller (101) increases the number of revolutions of the second compressor (22) in step ST46. Specifically, the outdoor controller (101) raises the upper limit of the range in which the number of revolutions of the second compressor (22) is controlled.

—Features of Variation—

The second on-off valve (32) corresponds to a second valve of the present disclosure.

In the variation, if the first condition is satisfied after the second action, the outdoor controller (101) executes the fifth action of closing the second on-off valve (32) of the flow path switching mechanism (30), and outputting the signal for opening the indoor expansion valve (63) to the air-conditioning unit (60).

Opening the indoor expansion valve (63) causes the refrigerant in the heat source circuit (11) to be sent to the pipe from the indoor expansion valve (63) to the second on-off valve (32). This can further lower the high pressure. An operation in which the second and third compressors (22) and (23) compress the refrigerant in two stages can be continued. This can reduce a decrease in the efficiency of the compression element (20) as compared to the operation in which only the third compressor (23) compresses the refrigerant in a single stage.

In the variation, if the first condition is satisfied after the fifth action, the outdoor controller (101) reduces the number of revolutions of the second compressor (22).

Reducing the number of revolutions of the second compressor (22) can further lower the intermediate pressure of the intermediate flow path (18).

Other Embodiments

The above embodiment and variations may also be configured as follows.

The refrigeration apparatus (1) of each of the embodiment and the variations may be configured not to include the cooling heat exchanger (28), the injection flow path (43), and the injection valve (46).

The refrigeration apparatus (1) of each of the embodiment and the variations may be configured not to include the intercooler (29).

The refrigeration apparatus (1) of the embodiment may be configured to perform only the cooling and refrigeration-facility operation without including the flow path switching mechanism. The refrigeration apparatus (1) having this configuration may perform the control shown in FIGS. 9 and 10.

The action in step ST17 of the embodiment may be executed when the number of revolutions of the third compressor (23) is a predetermined value smaller than its maximum value.

The action in step ST20 of the embodiment (the second action) may be executed when the number of revolutions of the first compressor (21) is a predetermined value greater than its minimum value.

While the embodiments and variations have been described above, it will be understood that various changes in form and details can be made without departing from the spirit and scope of the claims. The above embodiments and variations may be appropriately combined or replaced as long as the functions of the target of the present disclosure are not impaired. The ordinal numbers such as "first," "second," "third," . . . , described above are used to distinguish the terms to which these expressions are given, and do not limit the number and order of the terms.

INDUSTRIAL APPLICABILITY

As can be seen from the foregoing description, the present disclosure is useful for a heat source unit and a refrigeration apparatus.

EXPLANATION OF REFERENCES

1 Refrigeration Apparatus
6 Refrigerant Circuit
11 Heat Source Circuit
18 Intermediate Flow Path
21 First Compressor
22 Second Compressor
23 Third Compressor
24 Outdoor Heat Exchanger (Radiator)
25 Gas-Liquid Separator
30 Flow Path Switching Mechanism
40 Liquid Side Flow Path
41 Venting Pipe
42 Venting Valve (First Valve)
60 Air-Conditioning Unit
63 Indoor Expansion Valve (First Expansion Valve)
70 Refrigeration-Facility Unit
101 Outdoor Controller (Control Unit)

The invention claimed is:

1. A heat source unit comprising:
a heat source circuit connected to an air-conditioning unit and a refrigeration-facility unit to constitute a refrigerant circuit for performing a refrigeration cycle in which a high pressure is equal to or greater than a critical pressure; and
a control unit,
the heat source circuit including: a first compressor configured to suck a refrigerant from the air-conditioning unit; a second compressor configured to suck the refrigerant from the refrigeration-facility unit; an intermediate flow path into which the refrigerant compressed in the first and second compressors is discharged; a third compressor configured to suck the refrigerant from the intermediate flow path; a radiator; a liquid side flow path connected to a liquid end of the radiator; a gas-liquid separator provided in the liquid side flow path; a venting pipe through which gas in the gas-liquid separator is sent to the intermediate flow path; and a first valve configured to open and close the venting pipe, wherein
if a first condition that an intermediate pressure corresponding to a pressure of the intermediate flow path is greater than a predetermined value is satisfied in an operation in which the first, second, and third compressors are operated, the control unit executes a first action of increasing the number of revolutions of the third compressor.

2. The heat source unit of claim 1, wherein
if the first condition is satisfied after the first action, the control unit reduces the number of revolutions of the first compressor.

3. The heat source unit of claim 1, wherein
if the first condition is satisfied after the first action, the control unit executes a second action of performing an operation in which the first compressor is stopped and the second and third compressors are operated, and outputting a signal for closing a first expansion valve associated with the air-conditioning unit.

4. The heat source unit of claim 3, wherein
if the first condition is satisfied after the second action, the control unit executes a third action of performing an operation in which the first and third compressors are stopped and the second compressor is operated.

5. The heat source unit of claim 4, wherein
if a second condition that a discharge pressure of the second compressor is greater than a second predetermined value is satisfied after the third action, the control unit executes a fourth action of outputting a signal for opening the first expansion valve to the air-conditioning unit.

6. The heat source unit of claim 5, wherein
if the second condition is satisfied after the fourth action, the control unit reduces the number of revolutions of the second compressor.

7. The heat source unit of claim 3, wherein
the heat source circuit includes a flow path switching mechanism including a second valve configured to switch a flow path for the refrigerant, the second valve intermittently connecting a gas end of the air-conditioning unit and a suction portion of the first compressor together, and
if the first condition is satisfied after the second action, the control unit outputs a signal for closing the second valve and opening the first expansion valve associated with the air-conditioning unit.

8. The heat source unit of claim 7, wherein
if the first condition is satisfied after the fifth action, the control unit reduces the number of revolutions of the second compressor.

9. A refrigeration apparatus comprising:
the heat source unit of claim 1.

10. The heat source unit of claim 2, wherein
if the first condition is satisfied after the first action, the control unit executes a second action of performing an operation in which the first compressor is stopped and the second and third compressors are operated, and outputting a signal for closing a first expansion valve associated with the air-conditioning unit.

11. A refrigeration apparatus comprising:
the heat source unit of claim 2.

12. A refrigeration apparatus comprising:
the heat source unit of claim 3.

13. A refrigeration apparatus comprising:
the heat source unit of claim 4.

14. A refrigeration apparatus comprising:
the heat source unit of claim 5.

15. A refrigeration apparatus comprising:
the heat source unit of claim 6.

16. A refrigeration apparatus comprising:
the heat source unit of claim 7.

17. A refrigeration apparatus comprising:
the heat source unit of claim 8.

* * * * *